United States Patent
Lewis et al.

(10) Patent No.: US 12,442,643 B2
(45) Date of Patent: Oct. 14, 2025

(54) SNAP TO ROAD, POPULAR ROUTES, POPULAR STOPS, PREDICTING ROADWAY SPEED, AND CONTIGUOUS REGION IDENTIFICATION

(71) Applicant: Geotab Inc., Oakville (CA)

(72) Inventors: Daniel Jacob Lewis, Cambridge (CA); Chien An Liu, Mississauga (CA)

(73) Assignee: Geotab Inc., Oakville (CA)

( * ) Notice: Subject to any disclaimer, the term of this patent is extended or adjusted under 35 U.S.C. 154(b) by 306 days.

(21) Appl. No.: 17/945,228

(22) Filed: Sep. 15, 2022

(65) Prior Publication Data

US 2023/0082960 A1    Mar. 16, 2023

Related U.S. Application Data

(60) Provisional application No. 63/244,647, filed on Sep. 15, 2021.

(51) Int. Cl.
    *G01C 21/32*      (2006.01)

(52) U.S. Cl.
    CPC .................. *G01C 21/32* (2013.01)

(58) Field of Classification Search
    CPC ....................................... G01C 21/32
    See application file for complete search history.

(56) References Cited

U.S. PATENT DOCUMENTS

| | | | |
|---|---|---|---|
| 8,639,654 B2 | 1/2014 | Vervaet et al. | |
| 11,118,929 B2 | 9/2021 | Coleman et al. | |
| 11,669,714 B1 | 6/2023 | Akhtar et al. | |
| 11,710,409 B2 | 7/2023 | Nanda et al. | |
| 11,760,482 B1 | 9/2023 | Durand | |
| 2008/0004789 A1* | 1/2008 | Horvitz | G08G 1/0104 340/936 |
| 2013/0304348 A1* | 11/2013 | Davidson | G06Q 10/083 701/99 |
| 2020/0064139 A1 | 2/2020 | Mieth et al. | |

(Continued)

FOREIGN PATENT DOCUMENTS

| | | |
|---|---|---|
| EP | 0807803 A2 | 11/1997 |
| WO | WO 2009/053407 A1 | 4/2009 |

(Continued)

OTHER PUBLICATIONS

Extended European Search Report for European Application No. 22195793.9, dated Mar. 29, 2023.

(Continued)

*Primary Examiner* — Vivek D Koppikar
*Assistant Examiner* — Jeffrey R Chalhoub
(74) *Attorney, Agent, or Firm* — Wolf, Greenfield & Sacks, P.C.

(57) ABSTRACT

Systems and methods for associating vehicle trip data with a base map are provided herein. Systems and methods for providing vehicle trip data showing the greatest usage of routes between an origin and destination are also provided. Systems and methods for predicting a speed limit of a road based on vehicle trip data are also provided. Systems and methods for providing vehicle trip data showing popular stops between an origin and a destination are also provided. Systems and methods for providing contiguous region identification based on vehicle trip data are also provided.

20 Claims, 17 Drawing Sheets

(56) References Cited

U.S. PATENT DOCUMENTS

| | | |
|---|---|---|
| 2020/0307629 A1 | 10/2020 | Kohiga et al. |
| 2020/0365015 A1 | 11/2020 | Nguyen |
| 2022/0011118 A1* | 1/2022 | Beggel .................... G06N 7/01 |

FOREIGN PATENT DOCUMENTS

| | | |
|---|---|---|
| WO | WO 2020/109516 A1 | 6/2020 |
| WO | WO 2021/059601 A1 | 4/2021 |

OTHER PUBLICATIONS

Fiedler et al., Map matching algorithm for large-scale datasets. arXiv preprint arXiv:1910.05312. Sep. 12, 2019:1-8.

Newson et al., Hidden Markov map matching through noise and sparseness. GIS '09: Proceedings of the 17th ACM SIGSPATIAL International Conference on Advances in Geographic Information Systems. Nov. 4, 2009:336-43.

Osogami et al., Map matching with inverse reinforcement learning. Proceedings of the Twenty-Third International Joint Conference on Artificial Intelligence. Jun. 30, 2013:2547-53.

Extended European Search Report dated Apr. 15, 2025 in connection with European Application No. 24215875.6.

Extended European Search Report dated Apr. 11, 2025 in connection with European Application No. 24215872.3.

Extended European Search Report dated Apr. 24, 2025 in connection with European Application No. 24215874.9.

Extended European Search Report dated Mar. 28, 2025 in connection with European Application No. 24215881.4.

\* cited by examiner

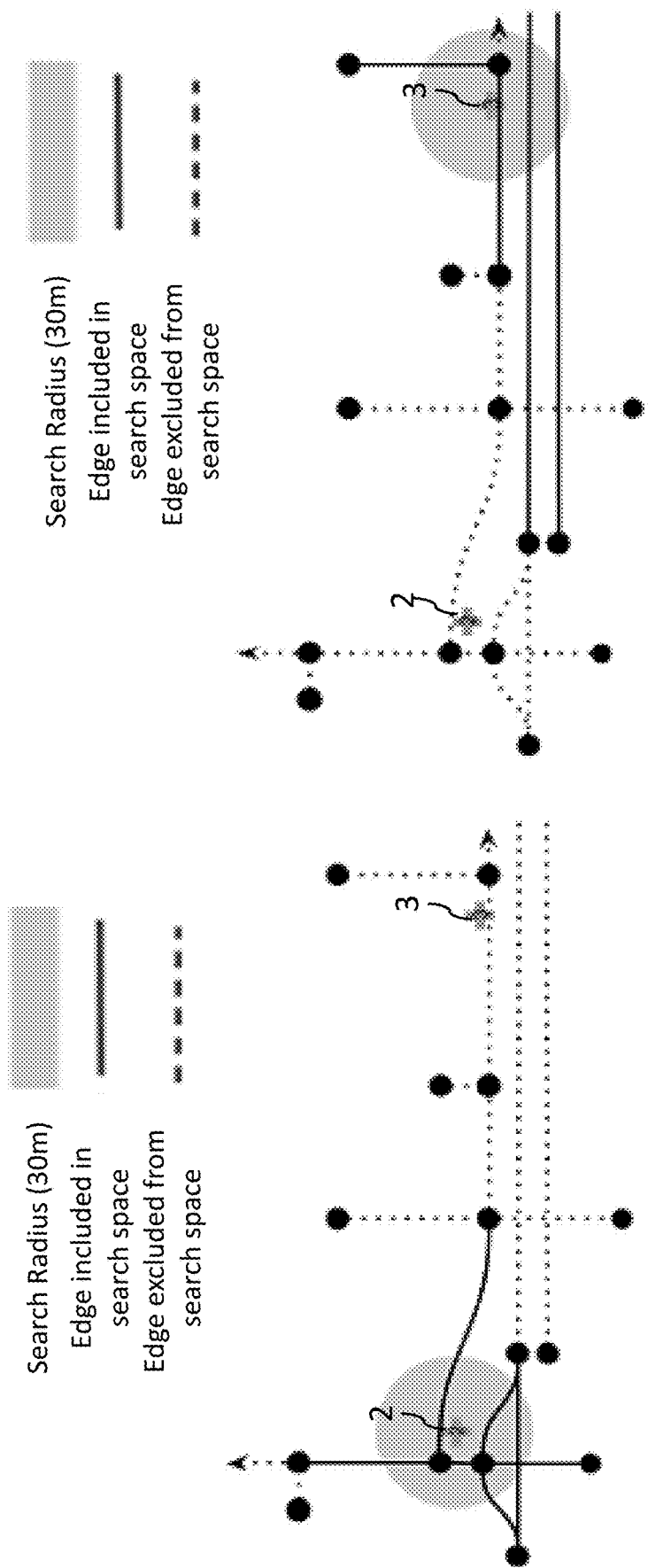

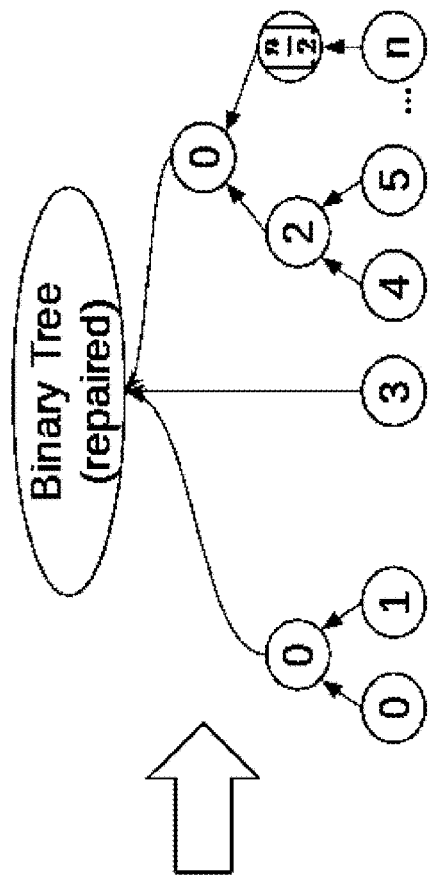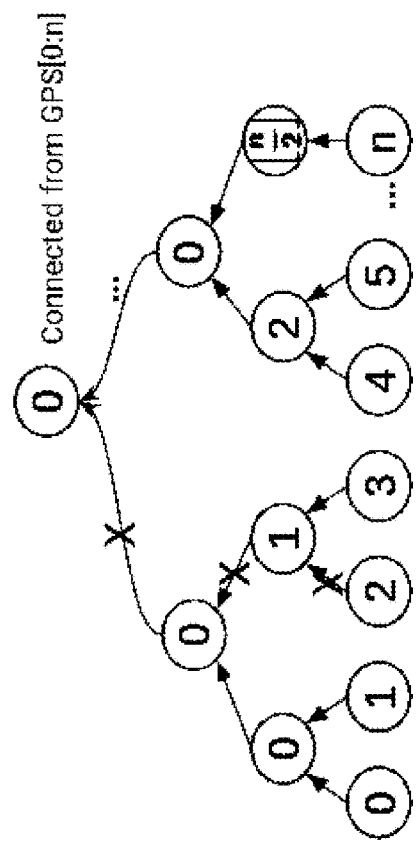
FIG. 8

SNAP TO ROAD, POPULAR ROUTES, POPULAR STOPS, PREDICTING ROADWAY SPEED, AND CONTIGUOUS REGION IDENTIFICATION

RELATED APPLICATIONS

This application claims the benefit of priority under 35 U.S.C. § 119(e) to U.S. Provisional App. Ser. No. 63/244,647, filed Sep. 15, 2021, the disclosure of which is incorporated herein by reference in its entirety.

FIELD

Disclosed embodiments are related to methods for associating vehicle trip data with a base map to generate trip information and employing such trip information for visualization of route usage, speed limit prediction, popular stops in vehicle trips, and contiguous region identification, as well as related systems.

BACKGROUND

Vehicle location information, such as global positioning system (GPS) coordinates, is typically utilized to provide navigation services. Vehicles may include telemetry hardware devices that track GPS data during vehicle movement. Vehicles may include other devices and sensors that monitor various other vehicle parameters, such as, acceleration, speed, fuel level, airbag status, and/or other parameters.

SUMMARY

In some embodiments, a method for generating trip information includes obtaining telematics data from one or more telematics devices associated with a vehicle, the telematics data including GPS data associated with a trip taken by the vehicle, generating a graph representation of a road network, the graph representation including one or more edges representing one or more road segments in the road network, associating the GPS data with the graph representation of the road network at least in part by: identifying an ordered sequence of edges of the graph representation traversed by the vehicle during the trip, and associating the GPS data with the ordered sequence of edges, and generating trip information for the trip using the association between the GPS data and the ordered sequence of edges.

In some embodiments, a method of providing vehicle trip data includes receiving, from one or more telematic devices, trip data of a plurality of trips obtained by one or more telematic devices, associating the trip data of the plurality of trips with a base map, receiving an origin region and a destination region from a user as user input, creating an ordered sequence of edges for each trip of the plurality of trips, counting the number of times each edge appears in the plurality of trips, grouping similar routes based a shared edge distance of the plurality of trips being greater than a threshold edge distance, and outputting the grouped routes to the user.

In some embodiments, determining speed limits for one or more roads includes obtaining, from one or more telematic devices, trip data of a plurality of trips obtained by one or more telematic devices, the trip data including speed metrics associated each trip of the plurality of trips, generating a graph representation of a road network, the graph representation including one or more edges representing one or more road segments in the road network, associating the speed metrics of each trip with the one or more edges of the road network, comparing a first speed metric of the speed metrics with a known speed limit metric associated with a first edge of the one or more edges, and generating, based on a second speed metric and the comparison of the first speed metric and the known speed limit metric, a prediction of a speed limit for a second edge without a known speed limit metric.

In some embodiments, a method for generating trip information includes obtaining telematics data from one or more telematics devices associated with a vehicle, the telematics data including GPS data associated with a trip taken by the vehicle and generating a graph representation of a road network, the graph representation including one or more edges representing one or more road segments in the road network. The method also includes associating the GPS data with the graph representation of the road network at least in part by identifying an ordered sequence of edges of the graph representation traversed by the vehicle during the trip and associating the GPS data with the ordered sequence of edges. The method also includes generating trip information for the trip using the association between the GPS data and the ordered sequence of edges.

In some embodiments, a method of providing vehicle trip data includes receiving, from one or more telematic devices, trip data of a plurality of trips obtained by the one or more telematic devices, associating the trip data of the plurality of trips with a base map, receiving an origin and a destination from a user as user input, creating an ordered sequence of edges for each trip of the plurality of trips, counting a number of times each edge appears in the plurality of trips, grouping similar routes based a shared edge distance the plurality of trips being greater than a threshold edge distance, and outputting the grouped routes to the user.

In some embodiments, a method for determining speed limits for one or more roads includes obtaining, from one or more telematic devices, trip data of a plurality of trips obtained by the one or more telematic devices, the trip data including speed metrics associated each trip of the plurality of trips, generating a graph representation of a road network, the graph representation including one or more edges representing one or more road segments in the road network, associating the speed metrics of each trip with the one or more edges of the road network, comparing a first speed metric of the speed metrics with a known speed limit metric associated with a first edge of the one or more edges, and generating, based on a second speed metric and the comparison of the first speed metric and the known speed limit metric, a prediction of a speed limit for a second edge without a known speed limit metric.

In some embodiments, a method of identifying stops in vehicle trip data includes receiving, from one or more telematic devices, trip data of a plurality of trips obtained by the one or more telematic devices, associating the trip data of the plurality of trips with a base map, creating an ordered sequence of edges for each trip of the plurality of trips, identifying one or more deviations in the ordered sequence of edges for each trip of the plurality of trips, counting a number of times each deviation appears in the plurality of trips, and outputting a deviation having a greatest number of occurrences in the plurality of trips.

In some embodiments, a method for determining a contiguous region in a road network includes obtaining, from one or more telematic devices, trip data of a plurality of trips obtained by the one or more telematic devices, the trip data including speed metrics associated each trip of the plurality of trips, generating a graph representation of a road network, the graph representation including one or more edges representing one or more road segments in the road network, identifying intersections of major roads in the road network, tracing each edge extending from the intersections to determine a first list of edges from the intersections to a first middle spot of a first contiguous region, and generating, based the first list of edges to the first middle spot from the intersections, the first contiguous region.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 5A depicts a third step of the exemplary method of FIG. 3-6D;

FIG. 5B depicts a third step of the exemplary method of FIG. 3-6D;

FIG. 8 depicts another embodiment of a binary tree that may be employed according to exemplary methods herein;

DETAILED DESCRIPTION

Figure 1:
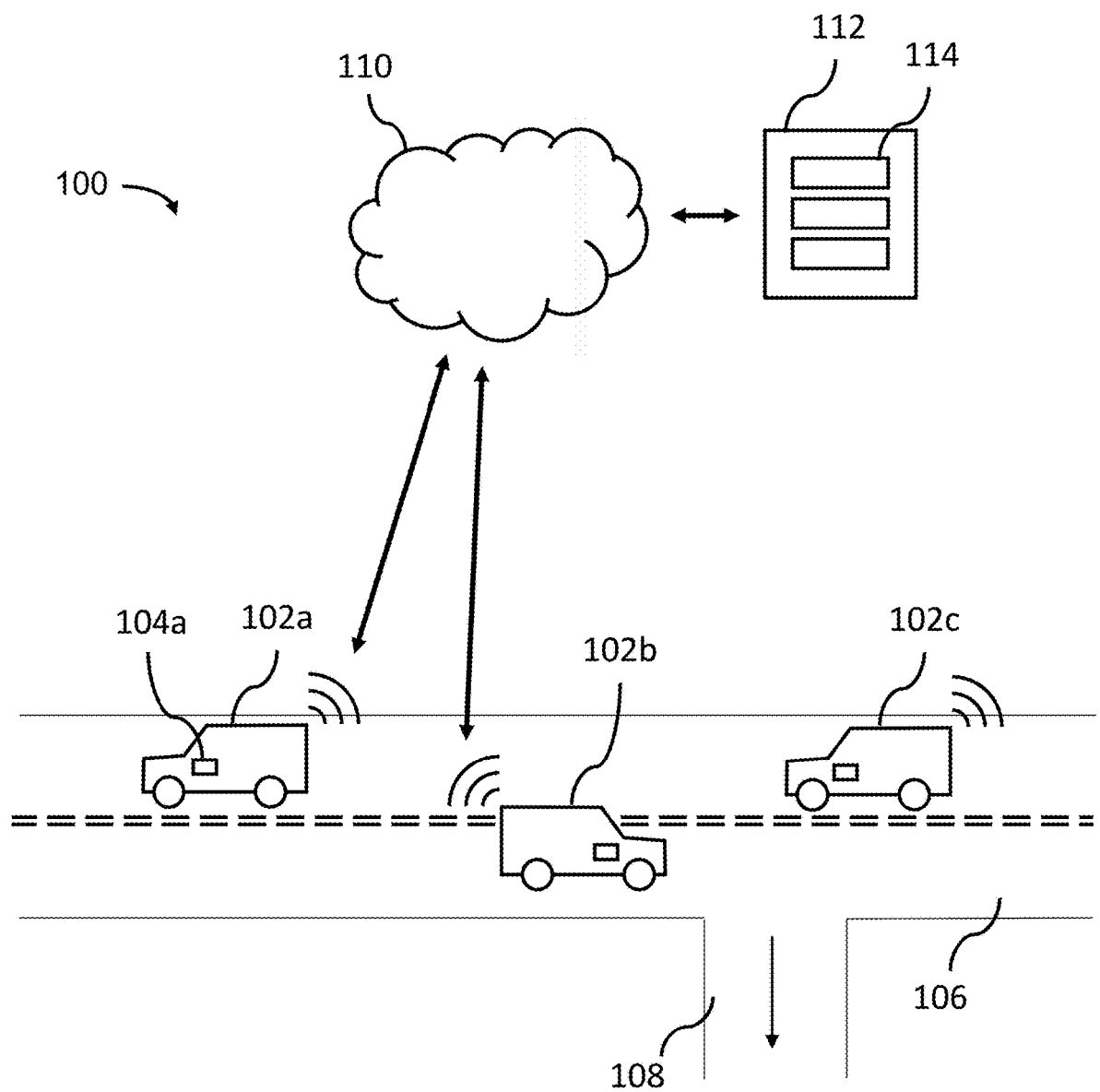
FIG. 1 is a schematic representation of an embodiment of a telematic system.

Typically, location data, such as GPS data is utilized to track a vehicle's location over time and infer the road that the vehicle is travelling on, for example, based on the vehicle's proximity to the road. Map data obtained from various map information providers, such as, OpenStreetMap (OSM) data or other map data, may be utilized to determine a vehicle's location using recently observed GPS coordinates and the determined vehicle location may be used to infer the road being traversed by the vehicle. The inventors have recognized that while such utilization of existing map data may be sufficient to enable basic map-based navigation services, it is inadequate at providing accurate matching of GPS data to known locations on a map (e.g., specific roads or road segments on the map including known highways, streets, intersections, service roads, overpasses, etc.). The inventors have additionally recognized and appreciated that these conventional map-based navigation techniques are inadequate at differentiating traffic between roads in close proximity to one another, such as an overpass and a ground-level road under the overpass or a highway and its service road. Furthermore, inventors have recognized that existing approaches that attempt to match location information to roads are inaccurate and inadequate at handling large amounts of data generated by different vehicles across multiple trips over time.

To overcome the drawbacks of existing techniques, the inventors have developed techniques that match or associate GPS data to known locations on a map, such as roads, road segments, intersections, etc., at high accuracy and low cost. The inventors have recognized and appreciated that reporting and matching telematics data at a granularity of a road or road segment rather than a GPS point may not only provide detailed information at the road/road segment level but may also enable accurate detection of traffic patterns at that granular level. Once a vehicle's GPS data is accurately matched to a known road or road segment, that data along with other collected telematics data for the vehicle can be combined with additional information associated with the road or road segment, such as, speed limit, number of lanes, number of potholes, and/or other road or read segment level information. This combined data may be analyzed and/or processed to provide comprehensive information about a trip taken by the vehicle and/or roads or road segments traversed during the trip. While the inventors have recognized the advantages that would be offered by such information at a fine resolution (e.g., road segment level), they have also identified that no technique has existed that could reliably provide this information. As such, the techniques developed by the inventors can not only process large volumes of data associated with a large number of trips but do so in a manner that is cost effective, computationally less expensive, and accurate.

According to some aspects, the inventors have appreciated the benefits of a method and system for generating trip information and associating that trip information with a graph representation of a road network. In particular, the inventors have appreciated that a road network may be divided into a plurality of edges. GPS data and other vehicle data may then be associated with an ordered sequence of edges. In this manner, the information may be "snapped" to an actual road as represented by an edge. Techniques described herein may allow for information to be accurately associated with a particular edge, even if the GPS data does not perfectly match the position information of an edge. Such an arrangement may be useful when aggregating large amounts of information, processing and/or filtering that information, and providing information regarding a particular road to a user.

According to some other aspects, the inventors have appreciated the benefits of a method and system for grouping similar routes from aggregated trip data. In particular, the inventors have appreciated the benefits of providing a user information regarding the most popular routes between an origin and a destination. For example, such information may be useful to traffic engineers, governments, or other agencies for road planning, management, and maintenance. Techniques described herein may allow for edges of a graphical representation of a road network to be counted based on the number of times they are traversed for a plurality of trips between an origin and destination. Based on a shared edge distance between multiple trips, routs may be grouped together and presented to a user as a popular route between the origin and destination.

According to some other aspects, the inventors have appreciated the benefits of a method and system for predicting speed limits for road within a road network where the speed limit information is not known. In many instances, actual speed limit information may be inaccessible or otherwise siloed and difficult to access. In such circumstances, the inventors have appreciated the benefits of forming a model to allow the prediction of a road speed limit based on an established relationship between measured speed for a trip and a known speed limit. Based on a comparison of a first measured speed metric and a known speed limit, an unknown speed limit may be predicted based on a second measured speed metric.

According to some other aspects, the inventors have appreciated the benefits of a method and system for identifying popular stops on a route between an origin and destination. During a process of associating vehicle trip information with a plurality of edges of a graphical representation of a road network, deviations in an ordered sequence of edges between an origin and destination may be determined. The deviations may be representative of stops or detours between the origin and destination. The deviations may be counted where the same deviations occur in multiple trips between the origin and destination, such that the deviations with the greatest number of occurrences may be provided to a user as a popular stop.

According to some other aspects, the inventors have appreciated the benefits of a method and system for determining a contiguous region in a road network. The method may allow the identification of groups or clusters of edges within a graphical representation of a road network between major roads. The method may include tracing edges from intersections of main roads to a middle spot of a contiguous region. With the edges traced inward from surrounding main roads, the contiguous region may be identified with the identification of the middle spot (e.g., a middle intersection). The contiguous region may be provided to a user and/or used to assign vehicle trip information to the edges within the contiguous region. For example, a residential contiguous region may have a single speed limit predicted for the entire contiguous region.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic representation of one embodiment of a system 100 for performing various processes described herein. System 100 may include multiple vehicles such as vehicles 102a, 102b, and 102c. Each vehicle may be associated with a telematics device (e.g., vehicle 102a is associated with telematics device 104a). As used herein, the term "telematics device" may refer to any device configured to monitor operation of a vehicle to which it is connected and to communicate data to a remote site. It should be appreciated that the term "telematics device" may refer to a device that is removably installed in and/or integral to a vehicle, as the present disclosure is not limited in this regard.

Each telematics device is configured to collect (or otherwise receive) telematics data and to transmit the telematics data through a communication network 110 to one or more destinations. Such destinations may include a server 112. As used herein, the term "telematics data" may refer to any data collected, received, analyzed, processed, communicated, or transmitted by a telematics device. While for ease of illustration, one server 112 is shown, it should be appreciated that server 112 may be implemented as one or more servers, including a distributed system of servers that operate together, such as a cloud service. Such server(s) 112 may be implemented as any suitable form of computing hardware, as embodiments are not limited in this respect. The server 112 may include software such as a trip information generation and analytics facility 114 that carries out the techniques described herein. It should be appreciated that a trip information generation and analytics facility need not be associated with a server, but rather that a trip information generation and analytics facility may be executed on any suitable hardware, as the present disclosure is not limited in this respect.

Transmission by the telematics device via the network(s) 110 may include any suitable transmission technique, including communication to a satellite, through a ground-based station, over a cellular network, over a computer network, over the Internet, and/or using any other suitable channel. Accordingly, network(s) 110 may include any suitable one or combination of wired and/or wireless, local- and/or wide-area communication networks, including one or more private or enterprise networks and/or the Internet. In some embodiments, telematics device 104 may transmit data using a wireless connection to a wireless wide area network (WWAN) such as a cellular network, after which it may be transmitted via one or more other networks (e.g., wired networks) to a destination such as a server 112. In some embodiments, a telematics device 104a streams data (e.g., contemporaneously with the data being generated and/or received by the telematics device 104a, or in real time) to the server 112 via the network(s) 110.

The telematics device 104a of FIG. 1 may include suitable hardware and/or software configured to collect, sense, receive, process, store, and/or transmit any appropriate telematics data associated with a vehicle. A telematics device 104a may be integrated into the vehicle or may be removably connected to a vehicle, such as through a diagnostic port (e.g., an on-board diagnostics 104a may include a hand-held device, which may include a mobile device such as a cellular telephone or smartphone. The telematics device 104a may communicate with one or more components of the vehicle 102a or otherwise receive from the vehicle 102a telematics data related to the vehicle 102a. The telematics device 104a may be configured to connect to a vehicle through an OBD II port or a CAN bus port or may be integrated into a vehicle's central control system. The telematics device 104a may then transmit the telematics data from the device 104a and vehicle 102a, to a destination remote from the vehicle 102a. It should be appreciated that the term "telematics device" may refer to hardware and/or software, as the present disclosure is not limited in this regard.

In some embodiments, vehicles 102a, 102b, 102c may be configured to collect and transmit information collected by sensors disposed in the vehicles 102a, 102b, 102c or otherwise collected by or relating to components of the vehicles 102a, 102b, 102c, such as through telematics devices installed in the vehicles 102a, 102b, 102c. The information collected and transmitted may include telematics data for the vehicle. The telematics data collected (e.g., received) by telematics devices in a number of vehicles may be transmitted to a remote site for analysis, such as by processes running on one or more servers. The telematics data that is collected, transmitted, and analyzed may include data generated by a number of different sensors of a vehicle, such as ambient temperature sensors, fuel sensors, speed sensors, and so on.

In some embodiments, vehicles 102a, 102b, 102c may transmit telematics data, which may include location data (e.g., GPS data) and/or time data. The telematics data may be analyzed to segment the data based on the geographic area in which the vehicle was located when the data was collected (e.g., based on the location data), and/or the time period during which the data was collected (e.g., based on the time data). As such, telematics data may be associated with a road and/or a road segment on which the vehicle was driving during a time period when the telematics data was collected. As used herein, a road may be understood as a public or private right of way on which a vehicle operates, and a road segment may be understood to be a portion of a road. As also described above, telematics data may include other information in addition to location and/or time data. Such telematics data may be collected from many different vehicles. Over time, a large quantity of data may be collected from many different vehicles. As this data may include information that enables indexing by both time and location, conclusions may be drawn that are both temporally and spatially specific.

As used herein, telematics data may include data relating to a vehicle 102a, 102b, 102c or operation of a vehicle 102a, 102b, 102c. Telematics data may be associated with a telematics device that is installed in or integrated with a vehicle 102a, 102b, 102c. The telematics device may receive and/or transmit the telematics data. While telematics data may be associated with a telematics device connected to a vehicle 102a, 102b, 102c, telematics data may additionally or alternatively be associated with one or more other devices. For example, telematics data relating to a vehicle or operation of a vehicle may be collected, received, and/or transmitted using an application on a smartphone. For example, telematics data related to vehicle location may be associated with location information from a smartphone. As another example, acceleration of a vehicle may be ascertained using data from one or more accelerometers of a smartphone.

Referring to FIG. 1, two vehicle 102a and 102c travelling on road 106 are travelling in one direction while a third vehicle 102b is travelling on the same road 106 in the other direction. Road 106 is depicted as a two-way road whereas road 108 is a one-way road. Telematics data may be collected from each of the three vehicles 102a, 102b, 102c and may include location data, time data, and/or other data for the respective vehicle. The collected telematics data may be processed and/or analyzed to identify characteristics associated with a trip taken by each of the vehicles and/or roads/road segments traversed during the trip. Examples of such characteristics may include, but are not limited to, the average speed and/or maximum speed of a vehicle during the trip and/or across various roads/road segments traversed during the trip, one or more directions in which the vehicle was travelling across various roads/road segments traversed during the trip, and/or any other characteristics associated with the trip.

In some embodiments, a trip may represent a route (e.g., roads/road segments) traversed by a vehicle from the time ignition was turned on to the time ignition was turned off. In some embodiments, a predetermined configurable time period of idling (e.g., 20 seconds or any other configurable time period) may be allowed for and considered as part of the trip. In some embodiments, an ignition off may indicate an end of a first trip but if a second trip starts within a predetermined time period (e.g., 10 seconds of any other time period) of the first trip, the two trips may be chained together indicating a longer trip taken by the vehicle.

Figure 2:
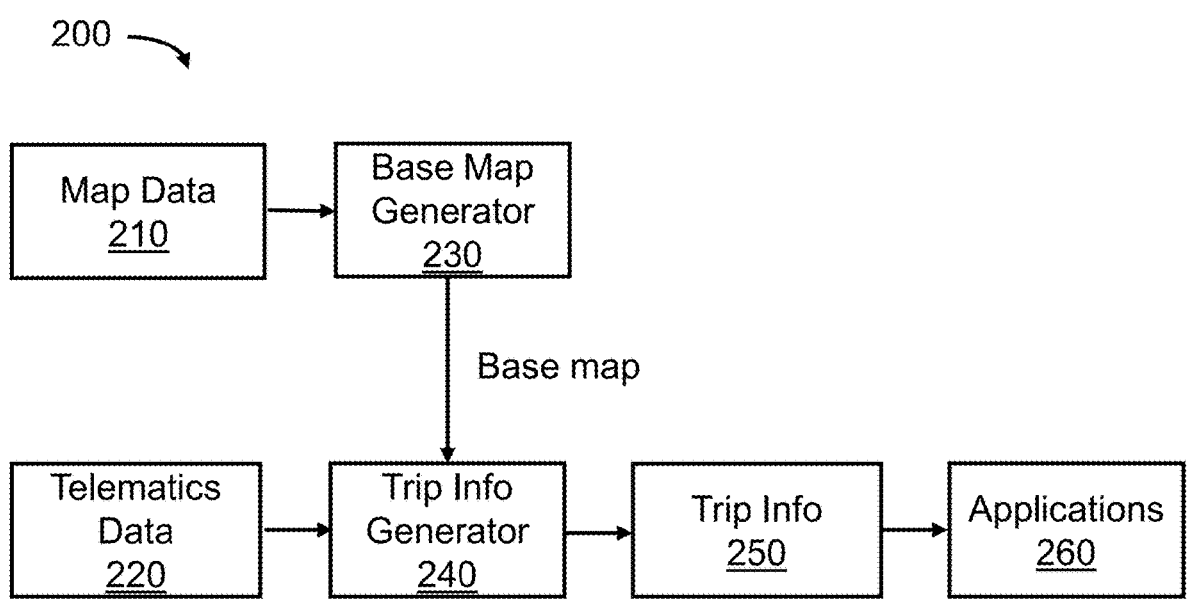
FIG. 2 depicts an embodiment of a system for generating trip information.

FIG. 2 depicts a system 200 for generating trip information in accordance with an embodiment of the technology described herein. One or more components may be, for example, executed by software, such as a trip information generation and analytics facility (e.g., trip information generation and analytics facility 114 of FIG. 1). System 200 may include base map generator 230 that generates a base map based on map data 210 obtained from one or more map information providers. Map data 210 may include geographic information of a road network associated with a city, a county, and/or a country. In some embodiments, map data 210 may include geographic information of a global road network of the world. The geographic information may include information regarding one or more roads in a particular geographic region.

Base map generator 230 may process map data 210 to generate a graph representation of the road network. The graph representation may be referred to herein as a "base map". Base map generator 230 may process the map data 210 to detect instances where two or more roads in the road network intersect or connect. An edge of the base map may be created for each detected instance of connecting or intersecting roads. For example, a vehicle travelling down a road may reach an intersection where a decision to take a left turn or a right turn may be made. Base map generator 230 may process the map data 210 to detect such decision points and generate a base map where all these decision points are represented as vertices or nodes in the graph representation.

In some embodiments, map data 210 may include OSM map data obtained from the OSM data model. OSM may define roads as ways. A road may be represented by one or more ways and a way may be represented by a series of nodes that define the geometry of the road. The latitude and longitude data associated with a node may define the location of the node and the order of nodes may define the geometry of the road. OSM map data may include a continuously updated open-sourced map of the world where road locations may be described as a series of GPS locations.

In some embodiments, base map generator 230 may process the OSM map data (e.g., data regarding nodes, order of nodes, and/or other metadata associated with the nodes) and generate a base map based on the OSM data. The OSM data (e.g., OSM ways) may be segmented based on detected intersecting or connecting points. In some embodiments, base map generator 230 may segment an OSM way into one or more edges. For example, the segmentation may be performed by identifying intersections between ways, where intersections may be identified by checking if multiple ways contained the same node. With the list of intersecting nodes, the way may be segmented into edges by going through the nodes in order and stopping whenever an intersecting node is reached.

In some embodiments, the OSM map data (or any other map data) may be updated periodically, e.g., monthly. Accordingly, the base map may also be updated periodically (e.g., monthly) to account for changes in the OSM map data.

In some embodiments, system 200 may include trip information generator 240 that generates trip information 250 based on telematics data 220 and a base map (e.g., a most recently updated base map). In some embodiments, telematics data 220 associated with a vehicle may include GPS data containing vehicle information, GPS location of the vehicle and/or time at which the telematics data was collected. In some embodiments, the base map may include a base map of a particular geographic region, such as a city or country. Trip information generator 240 may, for a given vehicle, analyze and/or process the telematics data 220 obtained from the vehicle in relation to the base map to generate trip information 250 for the vehicle. In some embodiments, the trip information 250 generated by the trip information generator 240 may identify a trip taken by the vehicle as an ordered sequence of edges of the base map. In order words, a trip taken by the vehicle may be identified as an array of edge traversals of the base map indicative of the roads or road segments traversed by the vehicle. Trip information generator 240 may generate an edge identifier (ID) that uniquely identified an edge, where the edge may represent an OSM way or portion of an OSM way that starts with or ends in an intersection with another way.

In some embodiments, trip information generator 240 may generate a trip ID for each trip taken by the vehicle. The trip identifier may uniquely identify each trip for a given hardware ID, where the hardware ID uniquely identifies the telematics device associated with the vehicle. Trip information generator 240 may generate an edge index for a trip indicating an order in which the edges of the base map are traversed during the trip. Trip information generator 240 may generate a GPS index for the trip, where the GPS index includes an index of GPS points (e.g., an array or time series of GPS points) associated with each edge traversal. In some embodiments, trip information generator 240 may, based on the edge identifier(s), the edge index, and/or the GPS index, accurately match or associate observed GPS data associated with the vehicle with one or more edges (e.g., edges indicating known roads or road segments) of the base map, for example, an ordered sequence of edges for the trip.

In some embodiments, trip information generator 240 may generate one or more timestamps indicative of times when the vehicle enters or leaves an edge. In some embodiments, trip information generator 240 may analyze the vehicle's telematics data and the base map to determine whether the vehicle completed a traversal of an edge. For example, a determination may be made that an edge traversal was not completed when the vehicle makes a U-turn. In some embodiments, trip generator 240 may analyze the vehicle's telematics data and the base map to detect U-turns and/or a direction of travel on the edge(s).

In some embodiments, trip information generator 240 may generate trip information for the trip using the association between the GPS data and the base map (e.g., ordered sequence of edges for the trip). The trip information generator 240 may, for a unique vehicle identifier provided as input, generate trip information 250 including, but not limited to, information about road segments at which the vehicle has traversed (e.g., based on identified edge traversals), information about the time at which the vehicle enters and exits the road segment, and/or any information associated with the road, the vehicle, or its movement on the road such as average speed or maximum speed, speed limit, direction of travel, road type, road name, vehicle make, model, and year, city ID, county ID, country ID, etc. In some embodiments, the average speed of the vehicle may be computed by averaging all raw speed observations of the vehicle over the course of movement on the road (i.e., over the course of traversing the edge). In some embodiments, the maximum speed of the vehicle may represent a maximum observed speed that the vehicle has achieved over the course of movement on the road (i.e., over the course of traversing the edge).

In some embodiments, trip information 250 may be generated for a number of different vehicles traversing the road network. The aggregated trip information generated by the trip information generator 240 may be utilized and processed by various applications 260, such as traffic analysis tools that assess traffic patterns over time, smart city applications, or intelligent transportation applications. At a high level, a smart city may be a city that collects and analyzes information (e.g., real-time telematics data) to make informed decisions. For example, the aggregated trip information associated with different vehicles may be analyzed to manage traffic flows, reduce congestion across certain roads, make decisions regarding signal prioritization and/or toll road placement, and/or perform other analytical observations.

Trip information 250 associated with a particular vehicle may be analyzed to determine one or more characteristics of the trip taken by the vehicle, for example, distances traveled by the vehicle on particular road types (e.g., highways vs. city roads), speed of the vehicle relative to the speed limit of a road or road type, direction and/or bearing of the vehicle when traversing roads, and/or other characteristics.

Aggregate trip information ascertained from trips taken by multiple different vehicles may be analyzed to assess traffic patterns. For example, aggregated trip information may be analyzed to determine the volume of traffic on particular roads during certain times of day. This information may be used to manage traffic flows across regions where congestion is a problem. For example, city officials or traffic engineering consultants may consider building a bridge in those regions or provide alternate routes for traffic flow to reduce congestion.

Figure 3:
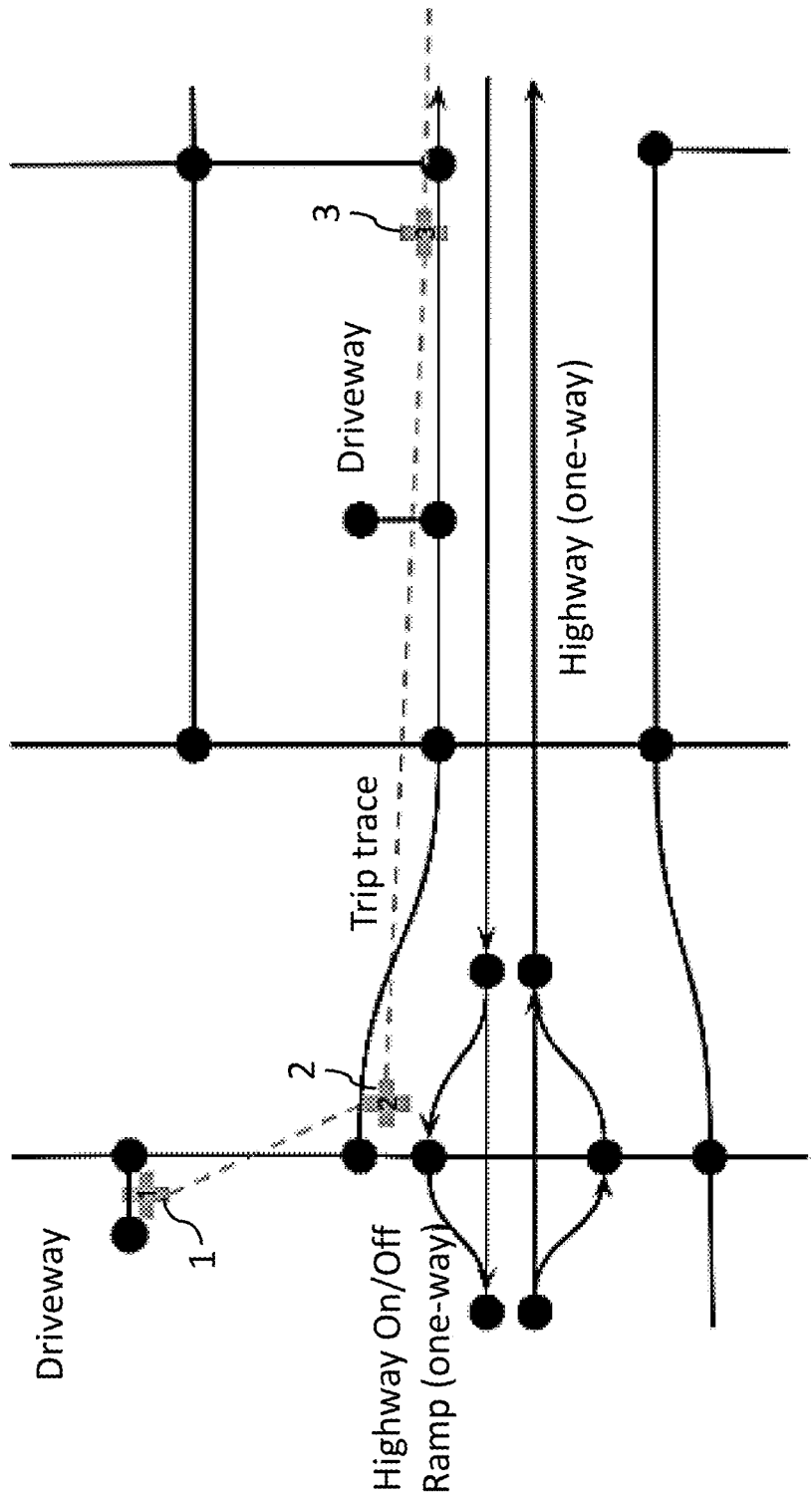
FIG. 3 depicts an embodiment of a first step of a method of FIGS. 3-6D performed by a system for generating trip information to match or associate GPS data associated with a trip to a base map.

In some embodiments, the trip information generator 240 may perform a method of associating or matching trip data (e.g., GPS data) associated with one or more trips with a base map (e.g., ordered sequence of edges corresponding to the one or more trips). The method may include receiving telematics data including trip data associated with one or more trips obtained by one or more telematic devices and GPS records associated with each trip. A GPS record may include latitude and longitude information indicating a GPS point on a map. The method may include using the time-series of GPS records to trace the trip to generate a trip trace, as shown in FIG. 3. The trip trace may be represented by drawing a line that describes the trip by connecting every GPS record (e.g., points 1, 2, 3) to the next using a straight line. The method may also include, computing one or more geohashes (that express location using a short alphanumeric string) associated with the trip or that the trip has traversed based on the trip trace. Geohashes may be computed from the latitude and longitude information of a GPS location obtained from the telematics device. In some embodiments, such a method allows for fast matching of candidate map edges by geohash. In some embodiments, the fast matching of candidate map edges may be performed at 7-character geohash precision, such that each geohash corresponds to a rectangle of 147 m by 147 m.

Figure 4:
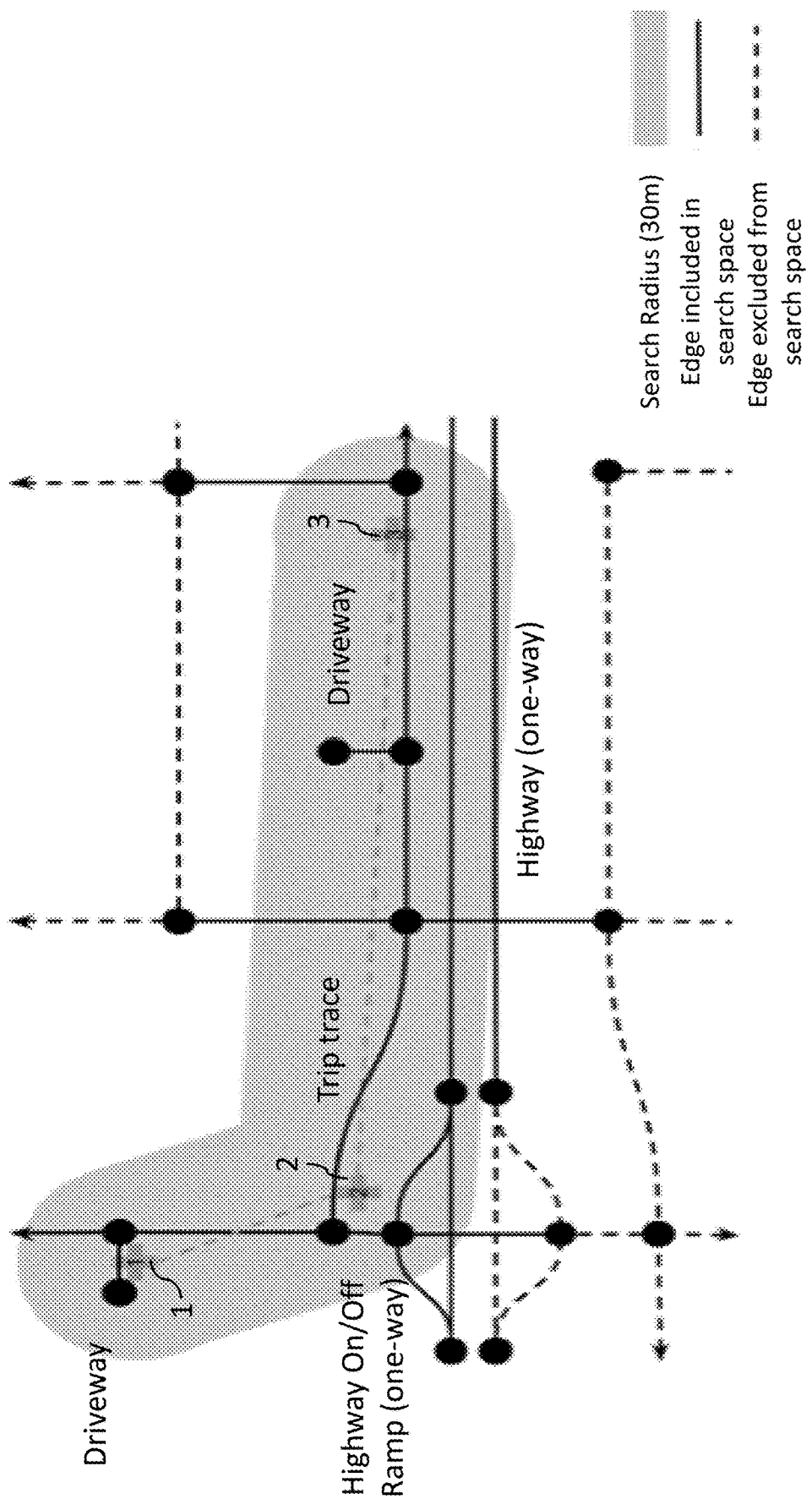
FIG. 4 depicts a second step of the exemplary method of FIGS. 3-6D.

The method may also include determining assigned edges for the trip based on the trip trace. The method may include, for each trip, creating a set of edges where a traversal is possible. This may be performed by matching each trip's geohashes to the list of geohashes of each edge maintained in the base map, resulting in all edges within 147 m of the trip trace. In some embodiments, this list of edges may be further filtered by a distance filter. For example, in some embodiments edges that are 30 m or further from the trip trace may be filtered out, though other distances are contemplated (e.g., 50 m, 10 m, etc.), and the present disclosure is not so limited. The list of possible edges for each trip form the assigned edges for the trip as shown in FIG. 4.

In some embodiments, any edge that is not connected to any other assigned edges may be removed. In some embodiments, more edges may be removed by shrinking the distance filter from a predetermined threshold distance (e.g., 30 m) down as far as possible without creating breaks between edges in the search space. The inventors have recognized that such steps may reduce the search space further for higher performance and efficient utilization of computational resources (e.g., processor resources, memory resources, etc.).

The method also may include determining closest edges to each GPS point in the trip. The method may include, for every GPS point in the trip, looking through edges in the search space within a predetermined threshold distance (e.g., 30 m) of the GPS point as shown in FIGS. 5A and 5B. The distance of each edge to the GPS point may be calculated then ranked from closest to furthest. In some embodiments, up to 10 edges for each GPS point may be considered in this manner though fewer or higher number of edges are contemplated and the present disclosure is not so limited. As shown in FIG. 5A, GPS point 2 is associated with edges shown in solid lines, whereas edges shown in dashed lines are not considered. As shown in FIG. 5B, GPS point 3 is associated with edges shown in solid lines, whereas edges shown in dashed lines are not considered.

The method may also include, as shown in FIGS. 6A-6D, producing a set of possible or candidate paths a vehicle may have taken from every fragment of a trip: the straight line from one GPS point to the next. This step may be performed using a shortest-path algorithm, where cost of each path corresponds to length of the path as well as one or more optional features for consideration such as sharp turns, travelling the wrong way on a one-way street, and distance to GPS point. In some embodiments, for every single fragment, the method starts from each of the closest edges for the starting point and at every iteration, looks for the next edge connected to the current edge, and evaluates the cost of each possible path up to now, keeping only a predetermined number of "best" paths (e.g., 50 paths), terminating at each of the edges closest to the ending GPS point. This process may yield a list of up to the predetermined number of "best" paths for the up to 10 edges at starting GPS point, ending at the up to 10 edges of the following GPS point. Potential solutions are scored based on the length of the path (where longer paths are less favored) and proximity of the starting or ending edges to their respective GPS point. Additional factors may be employed, in some embodiments. For example, sequences including sharp turns may be penalized in the cost function. Additionally, sequences in which the route requires going the wrong way on a known one-way path is penalized in the cost function. In this manner, an ordered sequence of edges may be identified using GPS points and a cost function to determine the "best" path for a given vehicle trip. Vehicle information associated with the GPS points may then be assigned to the ordered sequence of edges identified by the process shown and described with reference to FIGS. 6A-6D.

Figure 6A:
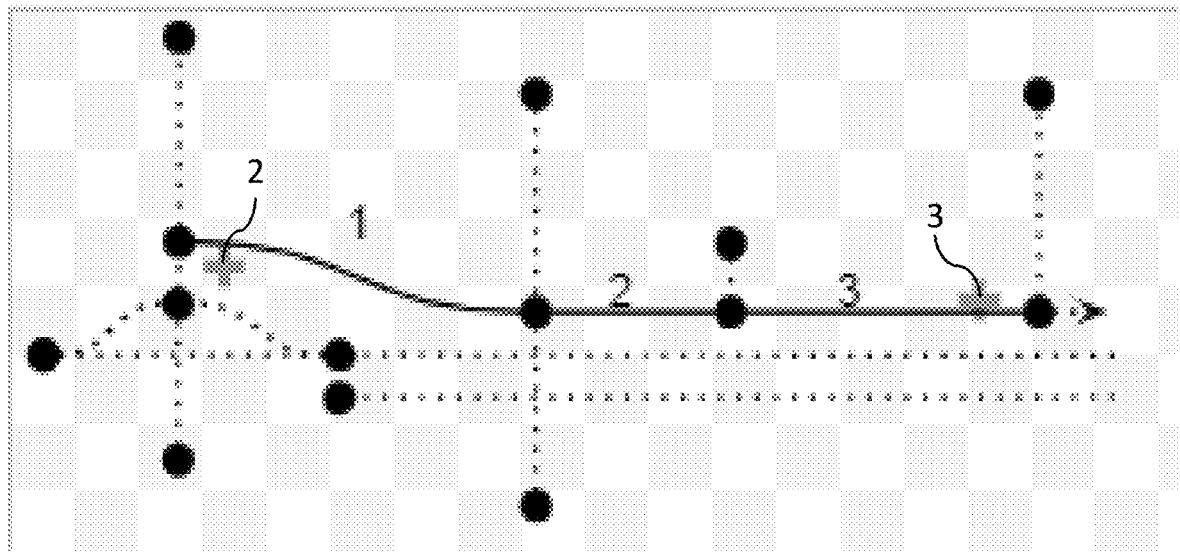
FIG. 6A-6D depict exemplary outputs of the exemplary method of FIGS. 3-6D.

As shown in FIG. 6A, an optimal route is shown. In the route of FIG. 6A, the closest edges to the GPS points 2 and 3 are used. Additionally, the shortest route is used with the least amount of edges 1, 2, 3, which incurs the least penalties when determining a cost of the route.

Figure 6B:
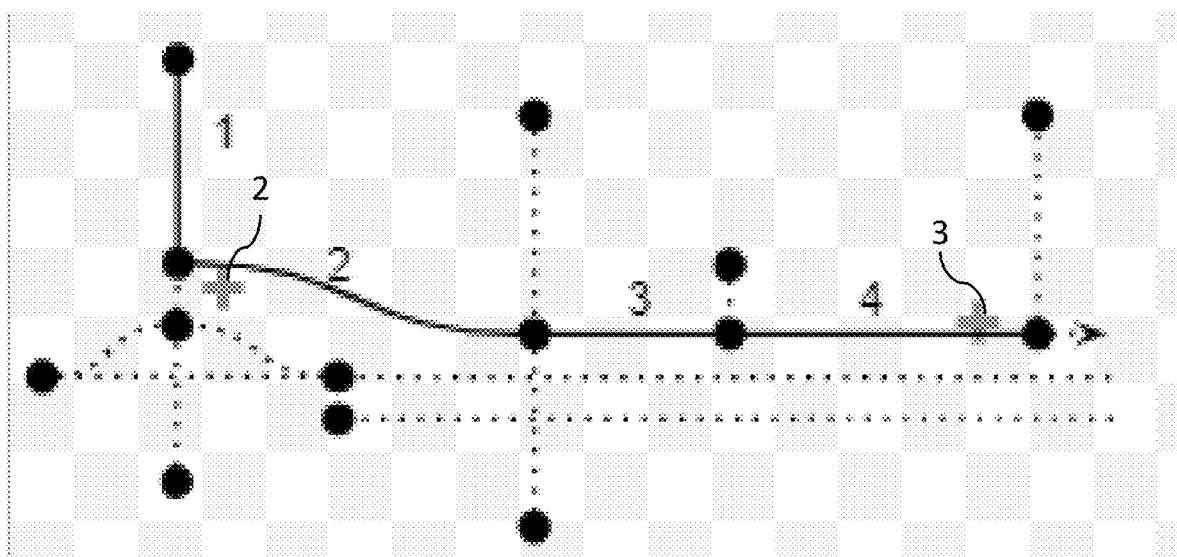

Another valid route is shown in FIG. 6B. Compared with the route of FIG. 6A, an additional edge 1 is added to the route. This route will be deemed less optimal than the route of FIG. 6A. This is because the addition of edge 1 as the stating edge is further from GPS point 2 than the edge 2. Additionally, the route is overall longer than the route of FIG. 6A. For these reasons, the route of FIG. 6B will be assigned a greater cost than the route of 6A.

Figure 6C:
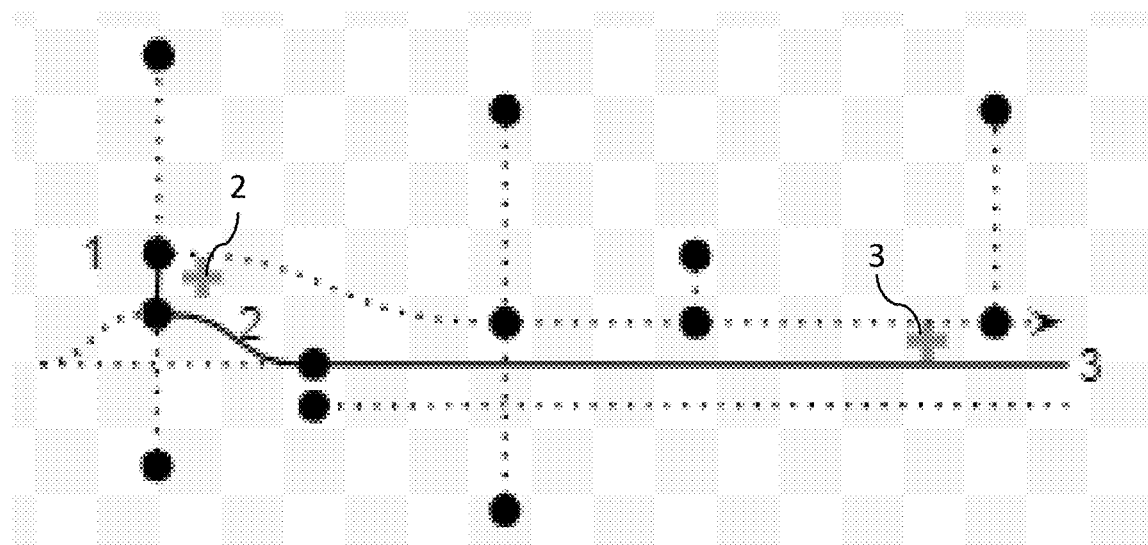

Another route is shown in FIG. 6C. Compared with the route of FIG. 6A, three different edges 1, 2, 3 within the search radius of the GPS point 2 and the GPS point 3 are selected. The overall distance and number of edges is similar to the route of FIG. 6A, and accordingly may have a similar score. However, in the route of FIG. 6C, the route is penalized because the route requires going the wrong direction on a one-way edge. Due to the penalty, the route of FIG. 6C will receive a lower score than the route of FIG. 6A and is therefore not the optimal route for assigning the GPS points to edges.

Figure 6D:
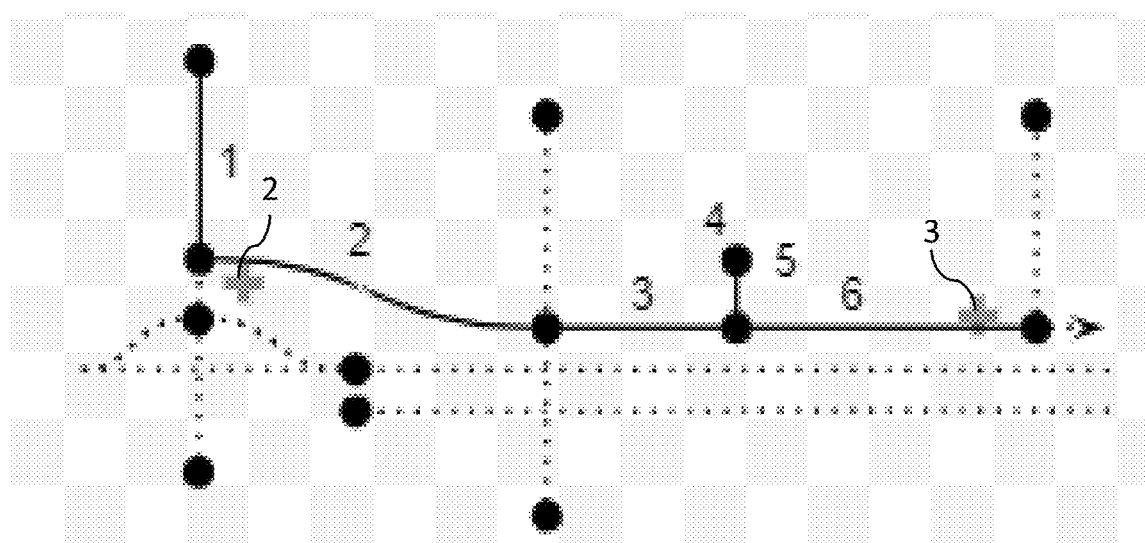

Yet another route is shown in FIG. 6D. In FIG. 6D, the route is similar to that of FIG. 6B, and may receive a lower score compared to the route of FIG. 6A because of the addition of edge 1 being further from GPS point 2 than edge 2, and because of the longer overall distance. Additionally, the route of FIG. 6D includes edges 4 and 5, which may be representative of a driveway before returning to the main road. In some cases, penalties may be applied to routes having sharp turns. In some embodiments, a sharp turn may be a turn of over 45 degrees from edge to edge. In FIG. 6D, the turn from edge 3 to edge 4, and the turn from edge 6 to edge 6, is approximately 90 degrees, exceeding the 45-degree threshold. Accordingly, in this example, the route of FIG. 6D may be further penalized for the presence of the turns for edges 4 and 5 and will therefore not be selected compared to the route of FIG. 6A.

Figure 7:
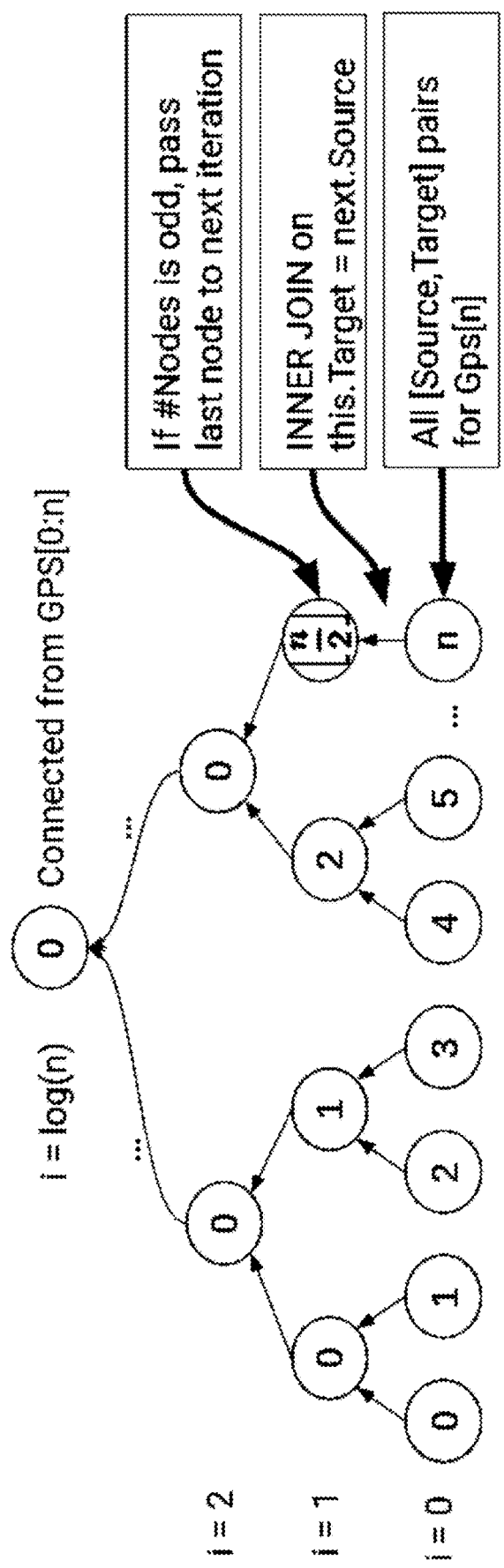
FIG. 7 depicts an embodiment of a binary tree that may be employed according to exemplary methods herein.

In some embodiments, the method may also include for each trip, with a list of fragments and the candidate paths for each fragment, stitching up the fragments as much as possible using a binary tree, as shown in FIG. 7. A binary tree may be a data structure where data is organized in a hierarchical format, where a parent node may be linked to two children nodes. The children nodes may have children on its own as the data structure may be recursive. Each fragment in a trip may be considered a child. The method may include combining two fragments together at a time (thus generating its parent) and repeating this process until a parent node is found containing all the fragments. Combining fragments may include combining all candidate paths associated with the fragments. For instance, a trip containing 65 GPS records may consist of 64 fragments numbered from 1 to 64. The method may include constructing a tree of combined fragments. At the first iteration 32 nodes may be created: combining (1, 2), (2,3), . . . , (63,64); thus yielding 32 "parents" for the 64 nodes. A second iteration would then combine these "2-fragment" two at a time, combining (1, 2) and (3,4), (5,6) and (7,8), . . . , and so on yielding 16 parents. This process may continue until all fragments are combined into a single combined path. Whenever, an odd number of fragments exist, the last non-paired fragment may not be paired and may be considered like any other fragment-pair in the next iteration.

In some embodiments, the method includes filtering incorrect fragment paths. Every instance where two fragments are combined, every possible path of both fragments are examined for connectivity. For example, by checking for a common starting edge (of the second fragment) and an ending edge (of the first fragment), a set of possible or candidate paths encompassing the two fragments are found. Any path that does not match adjacent fragments is discarded. This greatly reduces the number of possible paths that need to be considered, thereby reducing computational resources that need to be expended.

In some embodiments, at the first iteration all possible paths for a 1st fragment may be stitched with a 2nd fragment for every pair of paths where the ending edge of fragment 1 is the same as the starting edge of fragment 2. The new start and end edges may be recorded, and path cost may be summed across the pair of stitched paths. Likewise, this process may be performed for the 3rd and 4th fragments, 5th and 6th, and so on and so forth. At every following iteration, the fragment pairs may be paired again, updating all metrics. This process may conclude when the entire trip consists of one fragment unless there are gaps in the trip where the trip information generator 240 failed to match a GPS point.

In some embodiments, the method may include checking the output of the binary tree fragment steps above. If there is a gap in the path (e.g., the binary tree returns more than one fragment), then the fragments may be merged into a trip using a binary tree as shown in FIG. 8, starting with the highest level of the tree (e.g., most fragments paired), iterating down each level, until it reaches the leaf (e.g., a single fragment).

The method may also include, from all the possible paths found above, picking the path with the lowest cost. The method may also include, for every GPS point of the trip, reporting the list of edges matched to the GPS point in order taken as the fragment starting at that GPS point. The method may also include determining, for each trip, an ordered sequence of edges traversed by the vehicle during the trip and associating GPS points with the edges. The method may also include, for each trip, reporting an ordered list or sequence of edges traversed by the vehicle during the trip, the starting and ending GPS points numbers corresponding to the edge traversal—one GPS point may map to multiple edges, and one edge may map to multiple consecutive GPS points—along with approximate times the vehicle enters and exits the edge, calculated from interpolating GPS time stamps. The method may include outputting the result of the steps above via a graphical user interface. The output may include displaying the edges traversed during the trip on a map shown on the graphical user interface. Additionally or alternatively, trip information regarding the trip may be displayed. It will be appreciated that any trip information described herein may be output or displayed as the disclosure is not limited in this respect.

The inventors have recognized that the base map and trip information generated in accordance with the techniques described herein may be utilized for various purposes. Some uses cases have been described below. It will be appreciated, however, that the applicability of the techniques described herein is not limited to these uses cases.

Popular Routes

The inventors have also recognized the benefits of a method of providing vehicle trip information showing the popularity and/or usage of various routes between two geographical regions (e.g., points). The route usage and/or popularity may be employed to show sequences of road traversals between origin and destination regions or routes ranked in order of popularity for infrastructure evaluation, planning, and change management. The routes may also be associated with additional metadata to allow a user to determine what types of vehicles are taking what routes (e.g., vehicle class, weight, wheels), what time certain routes are being used, what routes include traffic congestion, etc. Accordingly, the method may allow a user to understand how a road network is used between origin and destination regions for use in infrastructure planning, road network management, etc.

In some embodiments, a method of providing vehicle trip information includes receiving, from one or more telematic devices, trip data of one or more trips obtained by one or more telematic devices and the GPS records associated with each trip. The trip data may include telematics data recorded for the one or more trips. The method may also include associating the trip data of the one or more trips with a base map (e.g., imported from OSM), as discussed above with reference to exemplary embodiments described herein. The method may also include receiving an origin region and a destination region (e.g., from a user as user input, for example, using a graphical user interface). In some embodiments, an origin region and/or destination region may be a point (e.g., geographical coordinates), neighborhood, city, country, zip code, or any other suitable geographical area. According to exemplary embodiments described herein, an origin or destination region may be a pre-defined region such as a city, county, zip code, etc., a user-defined polygon such as a port, or a neighborhood, or may be a street segment or collection of street segments. In some embodiments, the origin and destination may be input by a user using a graphical user interface. In some embodiments, a user may trace an origin region and a destination region on a map on the graphical user interface.

The method may also include determining one or more routes that vehicles traverse to get from the origin region to the destination region. As discussed above, associating the trip data (e.g., GPS points) of the one or more trips may include associating the trip data with one or more edges of a base map. In some embodiments, the method may include generating an ordered sequence of edges for each trip of the one or more trips. The inventors have recognized that the generated sequence of edges may have gaps, for example, in cases where GPS points could not be matched to edges. This may be due to changes in OSM map data (e.g., from month to month), and hence the base map from the time the trip concluded to the time of analysis. For example, a roadway may have changed due to construction, detours, or other reconfiguration. To address this, the method may include identifying the gaps and filling in the gaps based on information gathered from historical trips with a shortest path algorithm to approximate the most likely equivalent route or sequence of edges for the trip.

In some embodiments, the method may include determining a shortest-path between a gap start and a gap end of a gap in the trip data associated with the base map. The determined shortest-path may be employed to fill the gap in the trip data associated with the base map with the shortest-path. For example, in the case a historical trip is being used and a roadway has changed due to construction, detours, or other reconfiguration. The method may also include counting the number of times each edge appears in the one or more trips. The method may also include grouping similar routes based on one or more criteria, and outputting the grouped routes (e.g., to a user via a graphical user interface). In some embodiments, the one or more criteria include shared edge distance greater than a threshold edge distance. In some embodiments, a threshold edge distance may be greater than or equal to 75% of the total trip distance, 80% of the total trip distance, 85% of the total trip distance, 90% of the total trip distance, or another suitable distance. According to such embodiments, routes with substantial overlap may be grouped together. In some embodiments, the method may include chaining multiple trips of a vehicle together, for example, where one trip ends midway between the origin and destination, and subsequently resumes to the destination. In some embodiments, the method may also include filtering trips based on or more filtering criteria (e.g., based on input from a user, for example, received via a graphical user interface). In some embodiments, the filtering criteria include at least one selected from the group of travel time, number of trips (where optionally multiple trips are chained together), average vehicle speed, vehicle type, number of stops, and tolls. Any suitable filtering criteria may be employed, as the present disclosure is not so limited.

According to exemplary embodiments described herein, between a selected origin and destination a method may include determining all of the routes that vehicles traverse to get from origin to destination. The routes may be recent or historical. However, a base map employed in the analysis may be recent and may accordingly include updated road information that may not correspond to some historical trips. As a result, some historical routes may have one or more gaps. In some embodiments, the method may include filling in any gaps from historical trips with a shortest-path algorithm to approximate the most likely current equivalent route. Of course, any suitable method may be employed for filling gaps in historical route data, as the present disclosure is not so limited.

According to exemplary embodiments described herein, once routes are converted into an ordered sequences of edges (e.g., subsections of streets from one node to another where a node is an intersection), the ordered sequence of edges may be hashed. A method of providing vehicle trip information includes counting the number of telematic device traversals per hash. The method may also include generating associated metadata such as travel time, number of stops, etc. One or more filtering criteria may be used to visualize and/or filter the output for a user.

According to exemplary embodiments described herein, a method of providing vehicle trip information may provide for a comparison of a variety of metrics to understand traffic and/or national, regional, and/or local travel patterns. In some embodiments, routes having detours or small deviations from a main route may be considered similar to the main route so that similar paths may be aggregated into one overall route. For example, deviations from a route that are within a threshold deviation distance may be merged into an overall route. The threshold deviation distance may be less than or equal to 1.5 km, 1 km, 0.75 km, 0.5 km, or any other suitable distance. In some embodiments, the threshold deviation distance may be a percentage of the overall distance of the route. In some such embodiments, the threshold deviation distance may be less than 2% of the total route distance, 1% of the total route distance, 0.5% of the total route distance, or another suitable percentage. In some embodiments, a deviation from a main route may be recorded in metadata associated with a route. In some such embodiments, the number of deviations for a given main route may be employed to output the most often used deviations, which in some cases may correspond to stops (e.g., gas stations, rest areas, off ramps, restaurants, hotels, etc.).

Figure 9A:
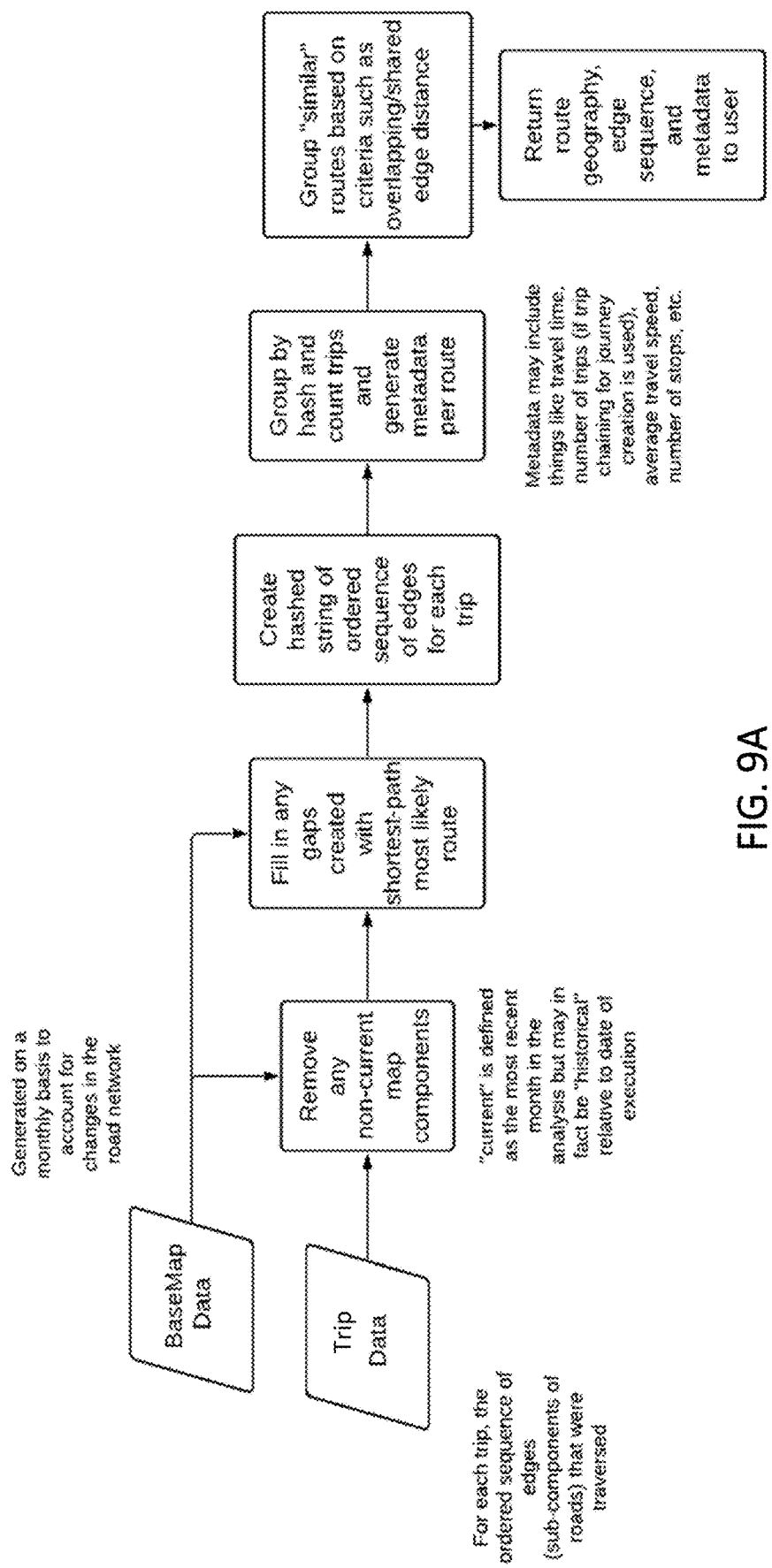
FIG. 9A depicts one embodiment of a process for determining one or more popular routes based on trip information, in accordance with some embodiments of the technology described herein.

FIG. 9A depicts a flow chart for an exemplary method of providing vehicle trip information to a user. As shown in FIG. 9A, the method includes receiving base map data and trip data. In some embodiments, the base map data and trip data may be based on an origin region and a destination region entered by a user (e.g., at a graphical user interface). The base map data may be sourced from various map information providers, such as, OpenStreetMap (OSM). The trip data may be sourced form one or more vehicles and/or telematic devices. For example, one or more vehicles may transmit trip data to a server, which may perform the method based on input from a user. In some embodiments, the trip data may be obtained as an output of a method of associating trip data with a map, as discussed above, and may include trip information described herein. In some embodiments the base map data may be a current (e.g., within 1 month) whereas the trip data may include historical trips older than the current base map. Accordingly, as shown in FIG. 9A, the method may include filling any gaps in the trip data and/or edge traversals created by a disparity between the trip data and the base map data (for example, when a road has changed after a trip was recorded). In some embodiments as shown in FIG. 9A, the method may include determining a shortest-path between a start of the gap and an end of the gap to determine the most likely route, and filling the gap with the determined shortest-path.

As shown in FIG. 9A, once the gaps in the trip data and/or edge traversals are filled, the method may further include creating a hashed string representation of an ordered sequence of edges for each trip. Next, the trip data may be grouped by the hash string and the trips counted for each hash string. In some embodiments, the grouping may be performed based on one or more criteria, such as, the hash string, country, or other criteria. In some embodiments, a number of edge traversals may be counted per hash string.

Additionally, in some embodiments as shown in FIG. 9A, the method may include generating metadata associated with each trip, which may include metadata associated with filtering criteria as discussed herein. The method may further include grouping similar routes based on one or more criteria. For example, as shown in FIG. 9A, the criteria may include overlapping or shared edge distance. Of course, any suitable criteria may be employed, as the present disclosure is not so limited. As shown in FIG. 9A, the method concludes, in some embodiments, by returning a route geography, edge sequence, and metadata to a user. In some embodiments, the method may return a map to a user displaying the route geography, edge sequence, and metadata. An exemplary map is shown in FIG. 9B.

Figure 9B:
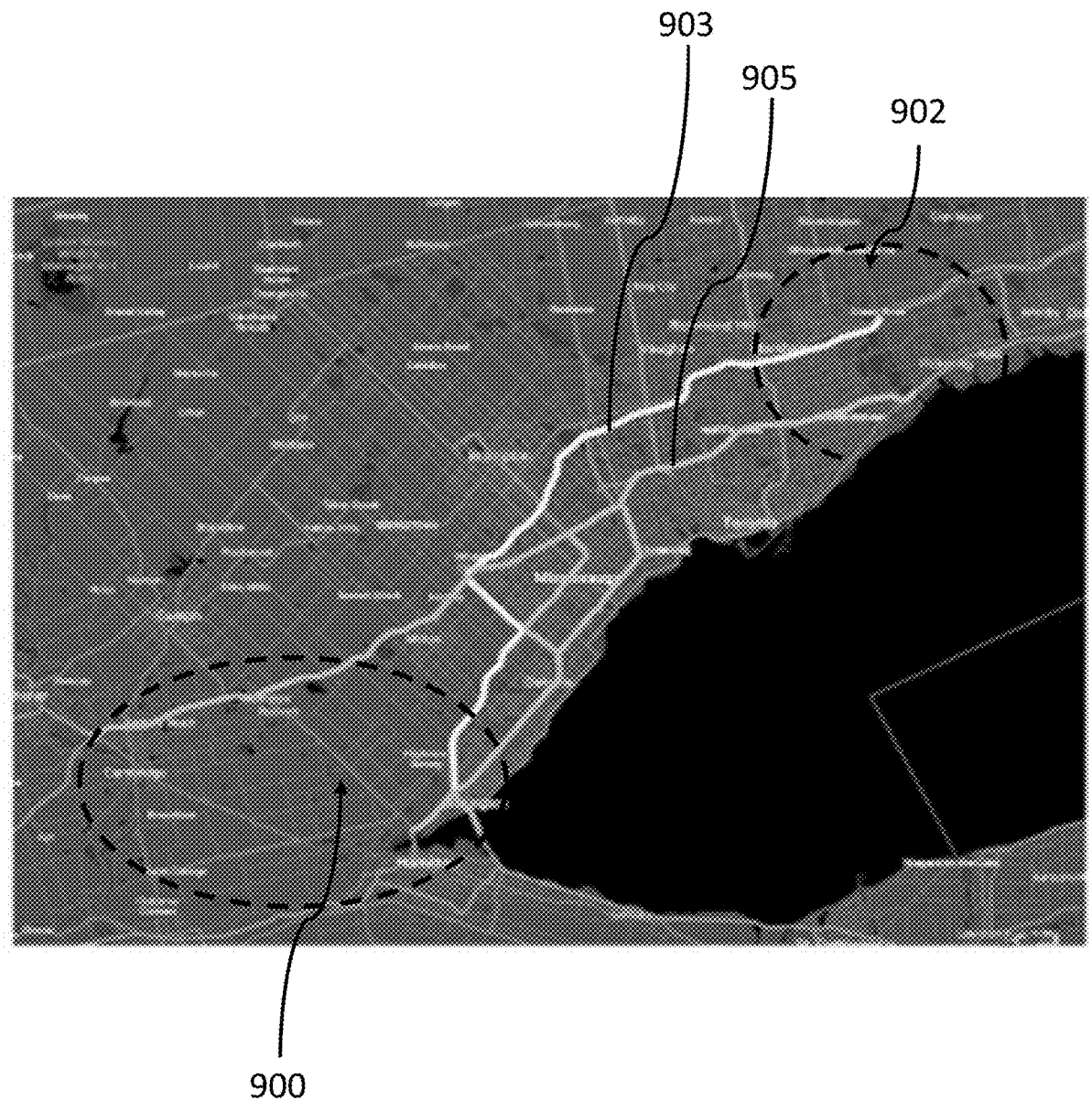
FIG. 9B depicts an exemplary map showing popular route data overlaid on the map, in accordance with some embodiments of the technology described herein.

FIG. 9B depicts an exemplary graphical output of a method of providing vehicle trip information to a user. In particular, FIG. 9B depicts an exemplary map showing popular route data overlaid on the map. As shown in FIG. 9B, the map includes an origin 900 that may have been input by a user. The map also includes a destination 902. In the example of FIG. 9B, the origin and destination are geographical regions, such that the trips do not all originate and end at the same geographical point. As shown in FIG. 9B, the most heavily utilized route 903, as determined according to the method described above, is shown in white. Lesser utilized routes 905 are shown in gray. Accordingly, a user may utilize the information provided by the method to determine the most popular routes between the origin and destination. In some embodiments, the method may include ranking the sequence of edges (e.g., road traversals) between origin and destination regions based on one or more ranking criteria to determine more utilized (and hence more popular) routes versus less utilized routes. In some embodiments, the trip data may be displayed in a manner selected by the user. For example, a user may select different colors between more utilized and less utilized routes (e.g., a color scale), different thicknesses of lines between more utilized or less utilized routes (e.g., a thickness scale), a combination thereof, or any other suitable visualization technique. Of course, while a map is shown in FIG. 9B, the method may also include outputting information in a different form, such as a table, as the present disclosure is not so limited.

Example of a data schema describing attributes and data type of output information is shown in the Table 1.

TABLE 1

| Attribute Name | Description | Data Type | Defined Value Set |
| --- | --- | --- | --- |
| Origin_ZoneId | Unique identifier for the origin zone. | Integer | — |
| Origin_Description | The description and/or name of the zone, if applicable. E.g., for a city, this attribute would be the name of the city. | String | — |
| Origin_Passthrough | Indicates whether a journey has to pass through the zone and stop (FALSE), or passthrough the zone and not stop (TRUE) | String | [TRUE, FALSE] |
| Origin_ISO_3166_2 | ISO-3166-2 code for the country and state | String | — |
| Origin_ZoneCategory | Category of the zone (i.e., city, state, zip code, forward sortation area, transportation analysis zone) | String | [City, County, State, TAZ, Zip Code, FSA] |
| Destination_ZoneId | Unique identifier for the destination zone. | Integer | — |
| Destination_Description | The description and/or name of the zone, if applicable. E.g., for a city, this attribute would be the name of the city. | String | — |
| Destination_Passthrough | Indicates whether a journey has to pass through the zone and stop (FALSE), or passthrough the zone and not stop (TRUE) | String | [TRUE, FALSE] |
| Destination_ISO_3166_2 | ISO-3166-2 code for the country and state | String | — |
| Destination_ZoneCategory | Category of the zone (i.e., city, state, zip code, forward sortation area, transportation analysis zone) | String | [City, County, State, TAZ, Zip Code, FSA] |
| Route Name | Automatically generated. Maybe a numeric indicator determined by number of journeys on that route (i.e., Route 1 has the most journeys, Route 2 seconds most) | String | — |
| Route | List of edges comprising the route | String | — |
| NumberOfJourneys | Number of journeys in the analysis for the given route. | Integer | — |
| TotalNumberOfJourneys | The total number of journeys across all | Integer | — |

TABLE 1-continued

| Attribute Name | Description | Data Type | Defined Value Set |
|---|---|---|---|
| | routes for a given OD pair. | | |
| JourneysPerDay | Average number of journeys per day in the analysis for the given route. | Float | — |
| PercentOfAllJourneys | For a given analysis the percentage of journeys that are driven on the given route as a percentage of TotalNumberofJourneys. | Float | — |
| AvgJourneyDuration | Average duration of a journey in the analysis for the given route. | Float | — |
| MedianJourneyDuration | Median duration of a journey in the analysis for the given reference route. | Float | — |
| StdevJourneyDuration | Standard deviation of the duration of a journey in the analysis for the given route. | Float | — |
| AvgNumberOfTripsPerJourney | Average number of trips per journey in the analysis for the given route. | Float | — |
| MedianNumberOfTripsPerJourney | Median number of trips per journey in the analysis for the given route. | Float | — |
| AvgTravelSpeed | Average travel speed (mph) of vehicles in the analysis for the given route. | Float | — |
| MedianTravelSpeed | Median travel speed (mph) of vehicles in the analysis for the given route. | Float | — |
| StdevTravelSpeed | Standard deviation of the travel speed (mph) of vehicles in the analysis for the given route. | Float | — |
| AvgRunningSpeed | Average running speed (mph) of vehicles in the analysis for the given route. | Float | — |
| MedianRunningSpeed | Median running speed (mph) of vehicles in the analysis for the given route. | Float | — |
| StdevRunningSpeed | Standard deviation of the running speed (mph) of vehicles in the analysis for the given route. | Float | — |
| AvgDistance | Average distance traveled (miles) by vehicles in the analysis for the given route. | Float | — |
| MedianDistance | Median distance traveled (miles) by vehicles in the analysis for the given route. | Float | — |
| StdevDistance | Standard deviation of the distance traveled (miles) by vehicles in the analysis for the given route. | Float | — |

TABLE 1-continued

| Attribute Name | Description | Data Type | Defined Value Set |
|---|---|---|---|
| AvgIdleDuration | Average engine idling duration (minutes) by vehicles in the analysis for the given route. | Float | — |
| MedianIdleDuration | Median engine idling duration (minutes) by vehicles in the analysis for the given route. | Float | — |
| StdevIdleDuration | Standard deviation of engine idling duration (minutes) by vehicles in the analysis for the given route. | Float | — |
| AvgInterTripDuration | Average trip duration (minutes) by vehicles in the analysis for the given route. (One or more trips make up a journey.) | Float | — |
| MedianInterTripDuration | Median trip duration (minutes) by vehicles in the analysis for the given route. (One or more trips make up a journey.) | Float | — |
| StdevInterTripDuration | Standard deviation of the trip duration (minutes) by vehicles in the analysis for the given route. (One or more trips make up a journey.) | Float | — |
| AvgEndOfJourneyDwell | Average time (minutes) that a journey dwells at the destination zone for the given route. (One or more trips make up a journey.) | Float | — |
| MedianEndOfJourneyDwell | Median time (minutes) that a journey dwells at the destination zone for the given route. (One or more trips make up a journey.) | Float | — |
| StdEndOfJourneyDwell | Standard deviation of the time (minutes) that a journey dwells at the destination zone for the given route. (One or more trips make up a journey.) | Float | — |
| PercentageOfVolumeByVehicleClass | An array of objects that yield the vehicle class and the percentage distribution for the given route. Returned as a JSON string. | String (JSON) | Example Entry: [{"CategoryIndex": 0, "VehicleClassIndex": 2, "VehicleClass": "Heavy Duty Trucks (>26,001 lbs)", "PercentageOfJourneys": 1}] |
| PercentageOfVolumeByVehicleVocation | An array of objects that yield the vehicle vocation and the percentage distribution for the given route. | String (JSON) | Example Entry: [{"VocationId": "LongDistance9To5", "VocationName": "LongDistance (Daytime)", "PercentageOfJourneys": 0.8}, |

TABLE 1-continued

| Attribute Name | Description | Data Type | Defined Value Set |
|---|---|---|---|
| | Returned as a JSON string. | | {"VocationId": null, "VocationName": null, "PercentageOfJourneys": 0.2}] |
| PercentageOfVolumeByIndustry | An array of objects that yield the industry (NAICS sector) and the percentage distribution for the given route. Returned as a JSON string. | String (JSON) | Example Entry: [{"NAICS_Code_1": 56, "PercentageOfJourneys": 1}] |

Popular Stops

The inventors have also recognized the benefits of a method of providing vehicle trip information showing the popularity and/or usage of various stops (e.g., driveways, fueling stations, commercial buildings such as restaurants, etc.) between two geographical regions (e.g., points). The stop usage and/or popularity may be employed to show stops ranked in order of popularity for infrastructure evaluation, planning, and change management. The stop may also be associated with additional metadata to allow a user to determine what types of vehicles are using what stops (e.g., vehicle class, weight, wheels), what time certain stops are being used, how long vehicles remain at stops, etc. Accordingly, the method may allow a user to understand how a stop in a road network is used between origin and destination regions for use in trip planning, infrastructure planning, road network management, placement of facilities, etc.

As discussed above, in some embodiments, a method of providing vehicle trip information includes receiving, from one or more telematic devices, trip data of one or more trips obtained by one or more telematic devices and the GPS records associated with each trip. The trip data may include telematics data recorded for the one or more trips. The method may also include associating the trip data of the one or more trips with a base map (e.g., imported from OSM), as discussed above with reference to exemplary embodiments described herein. The method may also include receiving an origin region and a destination region (e.g., from a user as user input, for example, using a graphical user interface). In some embodiments, an origin region and/or destination region may be a point (e.g., geographical coordinates), neighborhood, city, country, zip code, or any other suitable geographical area. According to exemplary embodiments described herein, an origin or destination region may be a pre-defined region such as a city, county, zip code, etc., a user-defined polygon such as a port, or a neighborhood, or may be a street segment or collection of street segments. In some embodiments, the origin and destination may be input by a user using a graphical user interface. In some embodiments, a user may trace an origin region and a destination region on a map on the graphical user interface.

The method may also include determining one or more routes that vehicles traverse to get from the origin region to the destination region. As discussed above, associating the trip data (e.g., GPS points) of the one or more trips may include associating the trip data with one or more edges of a base map. In some embodiments, the method may include generating an ordered sequence of edges for each trip of the one or more trips. The inventors have recognized that the generated sequence of edges may have gaps, for example, in cases where GPS points could not be matched to edges. This may be due to changes in OSM map data (e.g., from month to month), and hence the base map from the time the trip concluded to the time of analysis. For example, a roadway may have changed due to construction, detours, or other reconfiguration. To address this, the method may include identifying the gaps and filling in the gaps based on information gathered from historical trips with a shortest path algorithm to approximate the most likely equivalent route or sequence of edges for the trip.

According to exemplary embodiments described herein, a method of providing vehicle trip information may provide for a comparison of a variety of metrics to understand traffic and/or national, regional, and/or local travel patterns. In some embodiments, routes having detours or small deviations from a main route may be separately categorized as a stop. For example, deviations from a route that are within a threshold deviation distance but greater than a minimum deviation distance may be identified as a stop. The threshold deviation distance may be less than or equal to 1.5 km, 1 km, 0.75 km, 0.5 km, or any other suitable distance. The minimum deviation distance may be 10 m, 20 m, 30 m, 50 m, or any other suitable distance. In some embodiments, the threshold deviation distance may be a percentage of the overall distance of the route. In some such embodiments, the threshold deviation distance may be less than 2% of the total route distance, 1% of the total route distance, 0.5% of the total route distance, or another suitable percentage. In some embodiments, a location of an identified deviation from a main route (e.g., stop) may be recorded in metadata associated with a route along with associated vehicle information. In some such embodiments, the number of deviations for a given main route may be employed to output the most often used deviations, which in some cases may correspond to stops (e.g., gas stations, rest areas, off ramps, restaurants, hotels, etc.). In some embodiments, deviations may be counted across multiple vehicle trips. In some embodiment, one or more deviations having a greatest number of occurrences in the two or more trips may be output to a user (e.g., at a graphical user interface).

In some embodiments, the method may also include filtering stops based on or more filtering criteria (e.g., based on input from a user, for example, received via a graphical user interface). In some embodiments, the filtering criteria include at least one selected from the group of: stop time, stop type, deviation distance, number of trips, and vehicle type. Any suitable filtering criteria may be employed, as the present disclosure is not so limited.

According to exemplary embodiments described herein, once stops are identified (e.g., as an edge), the stop may be hashed. A method of providing vehicle trip information includes counting the number of telematic device traversals of the stop per hash. The method may also include generating associated metadata such as stop, number of stops, etc. One or more filtering criteria may be used to visualize and/or filter the output for a user.

Predicting Road Speed Limits

The inventors have recognized that map data 210, such as OSM map data, contains speed limit information for a limited number of roads in North America, e.g., only 13%-15% of roads in the US and Canada. The inventors have further recognized that comprehensive data sets on posted speed limits remain unavailable because speed limits are not recorded digitally and even if they are recorded digitally, they are maintained in city government silos such that the speed limits are associated with the city's own road network. Data maintained by the city regarding its own roads cannot be used to infer information outside the city. For example, information regarding Chicago's road network (e.g., speed limits) may be digitally recorded and maintained by Chicago's government databases, but similar information may not be available or maintained for New York's road network. Therefore, New York city officials are unable to make city planning decisions because there is no way of inferring speed limit information for roads in New York from known speed limit information associated with roads in a different city.

To address these shortcomings, the inventors have developed a speed limit inference model that infers the speed limit of every road segment, where speed limit is unknown, based on traffic speed on the road, the type of road, and/or its location (e.g., state/province, county, and city). Collectively, these inputs can be referred to as predictors for the model. In some embodiments, the model may be a linear regression model that is implemented using machine learning techniques, where known speed limits are used as labels. In some embodiments, the linear regression model may be employed to determine a mathematical relationship between a measured speed metric and a known speed limit metric for an edge within a graphical representation of a road network. In some embodiments, a non-linear regression may be employed (e.g., quadratic), as the present disclosure is not so limited. In some embodiments, a difference between a measured speed metric and a known speed metric may be employed to predict a speed metric for an edge with an unknown speed limit.

In some embodiments, the model uses speed limits from the few roads where data is available (e.g., 13%-15% of roads in the US and Canada) and the predictors for all roads, to learn the relationship or pattern between each predictor and the speed limit (from roads with available speed limit data). The model then applies this relationship or pattern to estimate speed limits for the roads where speed limit is unavailable. These speed limit estimates may be made available to the base map generator 230 and/or trip information generator 240. In some embodiments, the model infers or estimates speed limits for roads with unavailable speed limit data periodically (e.g., monthly), based on traffic speed of the previous month.

In some embodiments, a method for determining speed limits for one or more roads may be performed using the speed limit inference model. The method may include comparing the speed metrics observed by one or more vehicles (e.g., by telematic devices(s)) and speed limits associated with roads for which this information is known (or available) to identify patterns, such as, speeds at which vehicles typically travel on a particular road type with a known speed limit. The method may include applying the identified pattern to roads for which speed limits are unavailable (using additional observed speed metrics) to estimate or predict speed limits for those roads. For instance, if speed data and speed limit information is available for 15% of the roads in a region, this available information is leveraged to identify patterns between the speed data and the speed limits. The patterns may then be used to estimate speed limits for the 85% of the roads for which speed data is available but speed limit information is unknown.

In some embodiments, the method may include obtaining trip data of one or more trips obtained by one or more telematic devices. The trip data may include telematics data obtained by the one or more telematic devices. The trip data may include speed metrics associated each trip taken by the plurality of vehicles. In some embodiments, the trip data may be obtained as an output of a method of associating trip data with a map, as discussed above, and may include trip information described herein. The method may include associating the speed metrics of each trip with the one or more edges of base map. The method may include comparing a first speed metric of the speed metrics with a known speed limit metric associated with a first edge of the one or more edges. The method may include, generating, based on a second speed metric and the comparison of the first speed metric and the known speed limit metric, a prediction of a speed limit for a second edge without a known speed limit metric.

Figure 10:
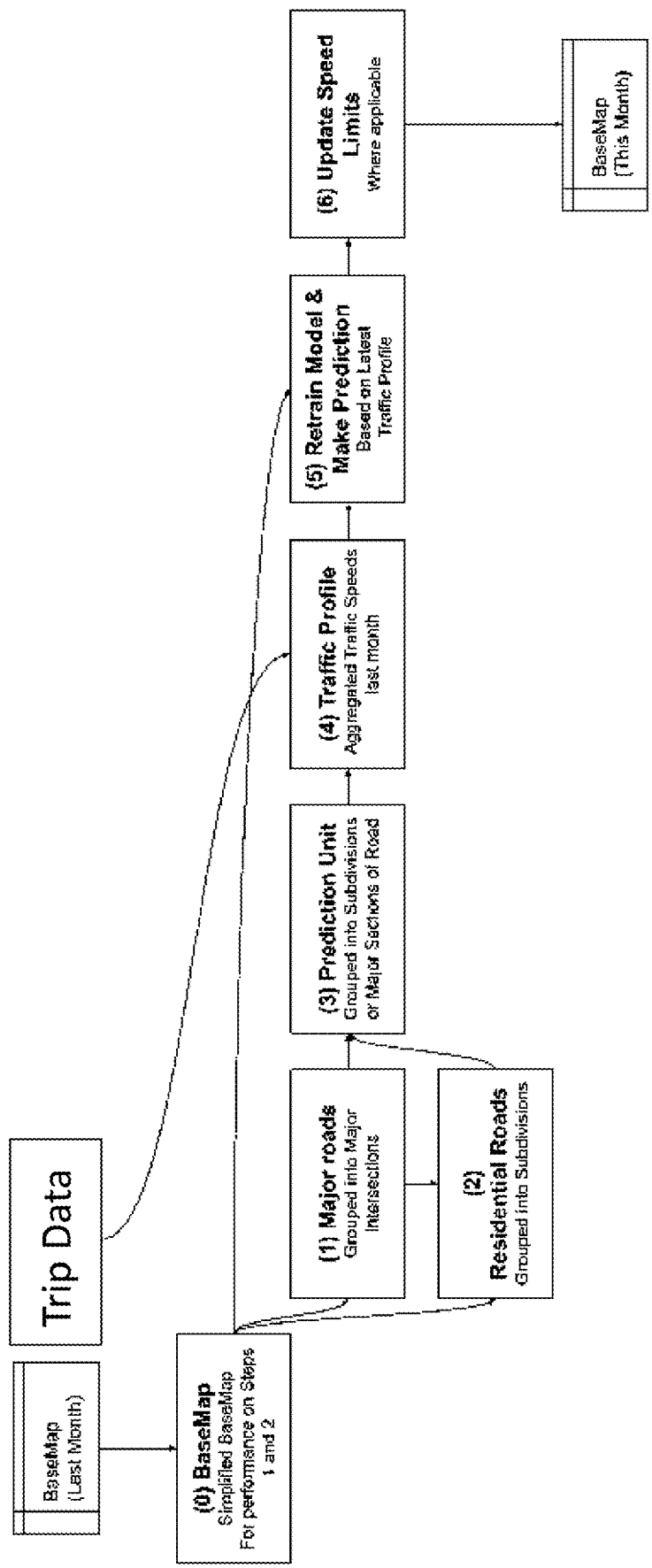
FIG. 10 depicts one embodiment of a process for determining speed limits for roads or road segments with unknown or unavailable speed limit information, in accordance with some embodiments of the technology described herein.

FIG. 10 illustrates an example method for determining speed limits for roads or road segments with unknown or unavailable speed limit information, in accordance with some embodiments of the technology described herein. In some embodiments, the method may be performed using the speed limit inference model and may determine speed limits using a base map generated by the base map generator 230 and trip information generated by the trip information generator 240. In some embodiments, a base map associated with a previous month may be used.

In some embodiments according to FIG. 10, all traffic data in the previous month, snapped or associated to road may be employed, along with a base map from the previous month and current month (in step (0)). First, the pipeline groups street segments into larger "units of prediction" where a single speed limit will be estimated. In step (1), for major, non-residential, roads, this involves grouping all road segments with the same name within each county. So, in some embodiments, any road with the same name in any county may only be assigned one speed limit. In step (2), for residential roads, clusters of residential edges may be grouped together into a subdivision, where a single speed limit may be assigned. For example, see FIGS. 15-17. In step (3), the results of steps (1) and (2) may be combined into a unified mapping of every edge in the base map to a prediction unit. In step (4), all traffic speeds (e.g., speed metrics) from the trip generation results in the previous month are aggregated. Since trip generation is done at the granularity of an edge, the mapping from (3) may be used to group edges into prediction units.

For example, for major roads, trip information snapped to every small edge may be grouped together by road name; and for residential roads may be grouped together into subdivisions. The results of this step are aggregated speed metrics for each prediction unit. For example, the 85-percentile speed across a street may be is x km/h, the 85-percentile speed in a subdivision is y km/h. Then, in step (5), a linear regression model may be re-trained using the latest month's traffic metrics from step (4) for prediction units with known speed limits. Once trained, the same traffic data for prediction units with unknown speed limits are fed into the linear regression model for prediction of unknown speed limits. Also as a part of step (5), the speed limit predictions for each unit are then mapped back to each edge. Finally, in step (6) the predicted speed limits are written to this the current months base map for use. In some embodiments, the base map with the predicted speed limits may be output to a user (e.g., at a graphical user interface).

In some embodiments, the method may include grouping road or street segments into larger "units of prediction" where a single speed limit may be estimated. For example, see below regarding contiguous region detection and FIGS. 15-17. For major, non-residential roads, the method may include grouping all road segments with the same name within each county such that any road in any county may only be assigned one speed limit. For residential roads, the method may include grouping clusters of residential roads into a subdivision, where a single speed limit may be assigned. The method may include combining the groupings above into a unified mapping of every edge in a base map to a prediction unit.

In some embodiments, the method may include aggregating traffic speeds from the trip information 250 associated with the previous month. The method may include using the unified mapping to group edges into prediction units. For example, for major roads, traffic information (e.g., speed metrics) associated with every small segment may be grouped together by road name, and for residential roads, may be grouped together into subdivisions. This grouping results in aggregated speed metrics for each prediction unit. For example, the $85^{th}$ percentile speed across a particular road or street, such as Dundas St. may be computed as X km/h and the $85^{th}$ percentile speed in a particular subdivision may be computed as Y km/h.

In some embodiments, the method may include re-training the model using the latest month's traffic metrics for prediction units with known speed limits. Once trained, the same traffic data for prediction units with unknown speed limits may be fed into the model for prediction. The prediction for each prediction unit may then be mapped back to each edge.

The method may further include updating the base map generated for the current month with the predicted or estimated speed limits.

Figure 11:
FIG. 11 depicts an example of major roads with edges before applying exemplary methods described herein.
Figure 12:
FIG. 12 depicts the example of FIG. 11 after applying exemplary methods herein to group edges.

An example of a process of predicting and assigning predicted speed limits is shown in FIGS. 11-12. FIG. 11 represents edges of major road with associated trip information before processing to apply predictive speed limits according to embodiments herein. As shown in FIG. 11, the roads are broken into noncontinuous segments. In some embodiments, to address this, a method may include extracts all nodes (e.g., intersections) and edges where the road type qualifies it as a major road: motorway, trunk, primary, secondary, and tertiary (e.g., all but residential and service roads). This will result in a list of intersections where sections will begin and end, as well as a list of edges which can be grouped into sections. In some embodiment, the method may also include a loop that, starting from every intersection, goes down every edge from the intersection and records the intersection it came from, then travels down to the next edge and labels its intersection and so on. This process may continue as long as there are edges without an intersection label. The result of this step may be a list of edges from every intersection to the "middle spot" of every section where two labeled intersections meet as a result of the looped edge tracing process. The method may then include combining the two halves on either side of the middle spot by connecting on the intersection where the two halves meet, and the two starting intersections of the two halves are then defined as the starting and ending intersection for the given section. The list of sections may then be grouped by road name in. Where prediction units are organized, sections without road names are left as their as an individual section of road. The result is shown in FIG. 12. Major roads are shown grouped as continuous edges, which may be assigned a single predictive speed limit in some embodiments.

Contiguous Region Detection

In some cases, the inventors have appreciated it may be desirable to group edges in a graphical representation of a road network into clusters based on a neighborhood, commercial district, etc. as edges within that contiguous region may share certain characteristics (e.g., speed limits). Such an arrangement may also be beneficial in order to support the cases where no road names are available for road edges. Accordingly, the inventors have appreciated speed limit prediction may be more accurate and/or less processing intensive if contiguous regions within a road network may be identified. Additionally, roads associated with certain regions may be filtered or otherwise processed differently for the determination of popular routes or stops. For example, routes or stops through a residential neighborhood maybe filtered, in some embodiments. In some embodiments, a contiguous region may be subject to a 15 km heuristic limit. Any limit or no limit may be employed in other embodiments, as the present disclosure is not so limited.

In some embodiments, a method for determining a contiguous region in a road network includes obtaining, from one or more telematic devices, trip data of a plurality of trips obtained by the one or more telematic devices, the trip data including speed metrics associated each trip of the plurality of trips, generating a graph representation of a road network, the graph representation including one or more edges representing one or more road segments in the road network, identifying intersections of major roads in the road network, as discussed elsewhere herein. The method may also include tracing each edge extending from the intersections to determine a first list of edges from the intersections to a first middle spot of a first contiguous region. The "middle spot" may be a location (e.g., an intersection or edge) where two or more traces from the major roads meet. The method may include generating, based the first list of edges to the first middle spot from the intersections, the first contiguous region. The generation of the contiguous region may include combining traces until all traces associated with the first contiguous region are combined. An example of such a method is discussed further with reference to FIGS. 15-17.

Figure 13:
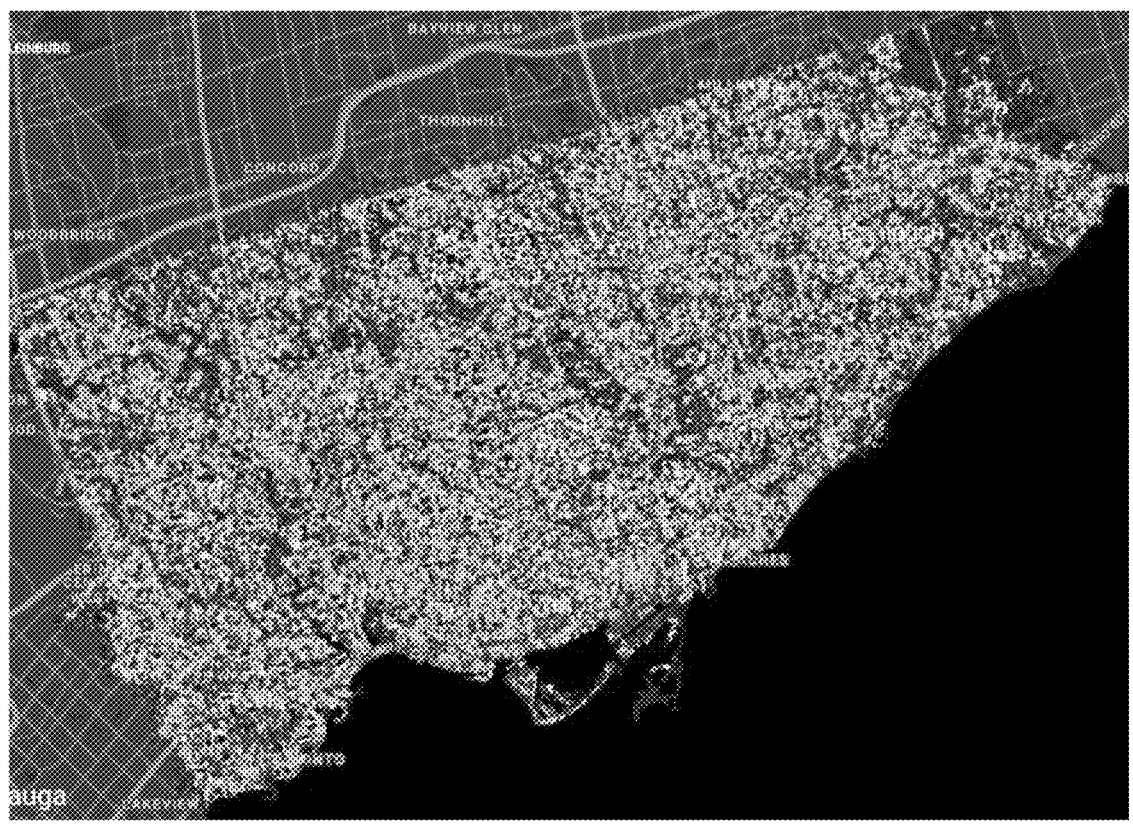
FIG. 13 depicts an example of residential roads after applying exemplary methods herein before detection of contiguous regions.
Figure 14:
FIG. 14 depicts the example of FIG. 13 after applying exemplary methods herein to detect contiguous regions.

As shown in FIG. 13, road edges are shown prior to a method of identifying contiguous regions between major roads. The road edges are individualized and ungrouped. As shown in FIG. 14, after the application of methods according to embodiments herein, several larger contiguous regions may be identified in a road network. Such regions may be employed to assist in prediction of speed limits or filtering vehicle trip data for output to a user, in some embodiments.

Figure 15:
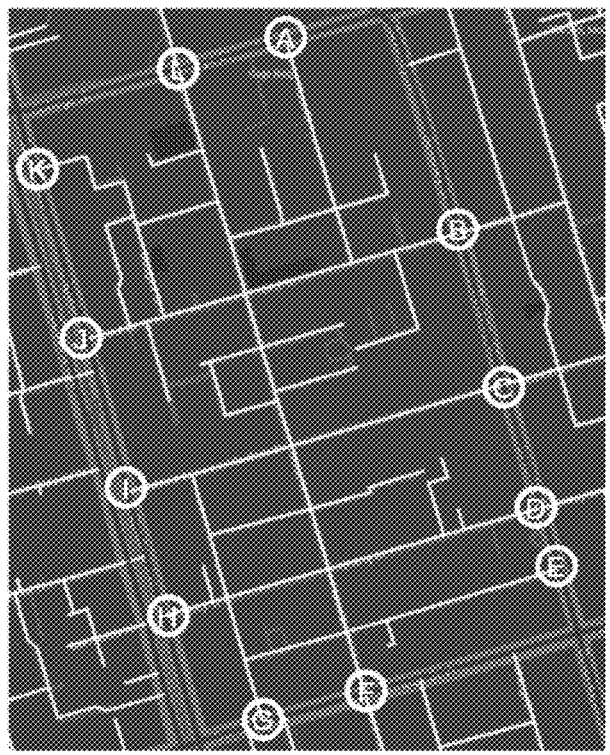
FIG. 15 depicts a first step of an exemplary method of FIGS. 15-17 detecting a contiguous region according to some embodiments.
Figure 16:
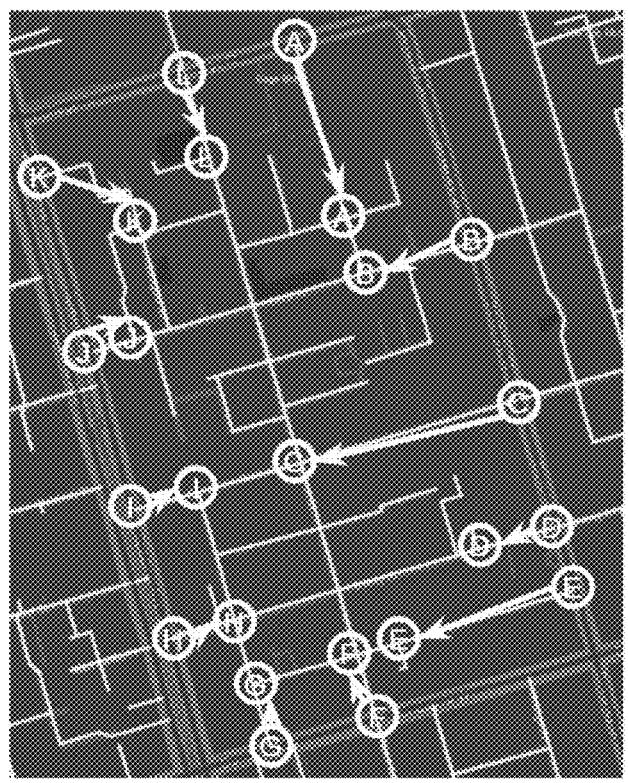
FIG. 16 depicts a second step of the exemplary method of FIGS. 15-17.
Figure 17:
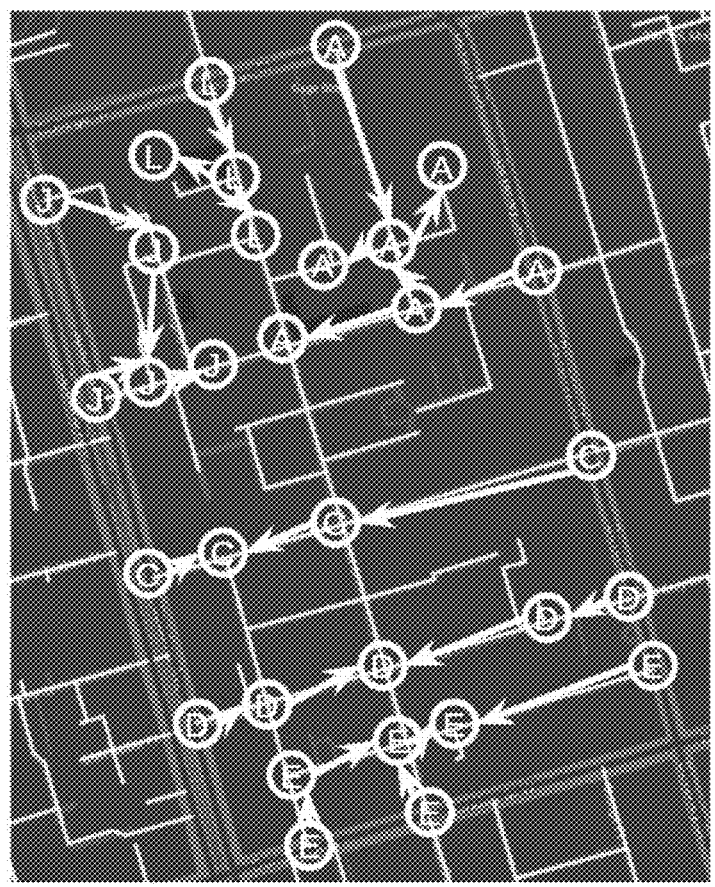
FIG. 17 depicts a third step of the exemplary method of FIGS. 15-17.

According to the embodiment of FIGS. 15-17, edges within a road network may be grouped into regions. The method of FIGS. 15-17 allows residential road edges between major roads may be grouped into clusters of roads, referred to as a region (e.g., subdivision, neighborhood, commercial district, etc.). By considering the road network as a graph, and then removing any non-residential road, "natural" clusters of residential roads that are connected to each other may be extracted, but not the rest of the graph (since any connection via a major road would have been removed); in graph theory, this may be referred to as a connected component.

The method begins with FIGS. 15-16. Starting at edges that touch a major road (i.e., share a common intersection) which by definition is on the boundary of a connected component, edges are traces from the boundary toward a "middle spot" of the connected component (e.g., region). The trace travels away from the boundary towards the center of the connected component. Traces along major roads may be ignored, as major roads may be filtered based on road type. For the newly, traversed edge of each trace, the starting intersection is labeled. The process continues as shown in FIG. 16. At every step, there is a check for multiple traces ended up at the same intersection. If so, we take all traces that touch are re-assigned as a group. This is done by setting every traces edge's starting intersection to be the intersection label with the same identifier. As shown in FIG. 16, the process includes marking every residential edge that intersects with a major road. This acts as the starting point of the detection algorithm (and eventually the boundary of the subdivision detected).

As shown in FIG. 17, at the second iteration, the current traced edges are connected to any residential edge connected to it and are assigned an identifier. The looping tracing process may terminate once no traces have an unknown starting intersection, as shown in FIG. 17. The re-assigned group including the same intersection ID can now be used to uniquely identify a cluster. As shown in FIG. 17, several groups have been re-assigned combining multiple traces from the major road boundaries. FIG. 17 represents an intermediary step that may continue until the entirety of the region bounded by the major roads being assigned a single intersection identifier, in some embodiments. As shown in FIG. 17, the intersection where each edge intersects a major road—as well as its identifier—may be combined and stored as "Subdivision ID" and will eventually be used to uniquely identify a subdivision, here denoted as letters A to L:

To improve the results, in some embodiments, any small cluster may be combined with adjacent clusters if they share a shared intersection. For example, an individual cul-de-sac on the other side of a major road from a large subdivision may be considered as their own cluster, unless this additional step is taken. This is done by running a disjoint set on the clusters, where having a shared intersection acts as them being neighbors. In some embodiments, sharing an intersection may cause clusters to be combined if at least one of the clusters is smaller than a threshold size (e.g., 15 square km).

Specific non-limiting embodiments are described herein. It should be understood that the various systems, components, features, and methods described relative to these embodiments may be used either individually and/or in any desired combination as the disclosure is not limited to only the specific embodiments described herein.

Techniques operating according to the principles described herein may be implemented in any suitable manner. Included in the discussion above are a series of flow charts showing the steps and acts of various processes that distribute telematics data related to one or more vehicles to one or more recipients, in accordance with constraints and/or requests. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application, for example as a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionalities may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 1106 of FIG. 18 described below (i.e., as a portion of a computing device 1000) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 1, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing devices (co-located or geographically distributed) dedicated to executing the techniques described herein, one or more Field-Programmable Gate Arrays (FPGAs) for carrying out the techniques described herein, or any other suitable system.

Figure 18:
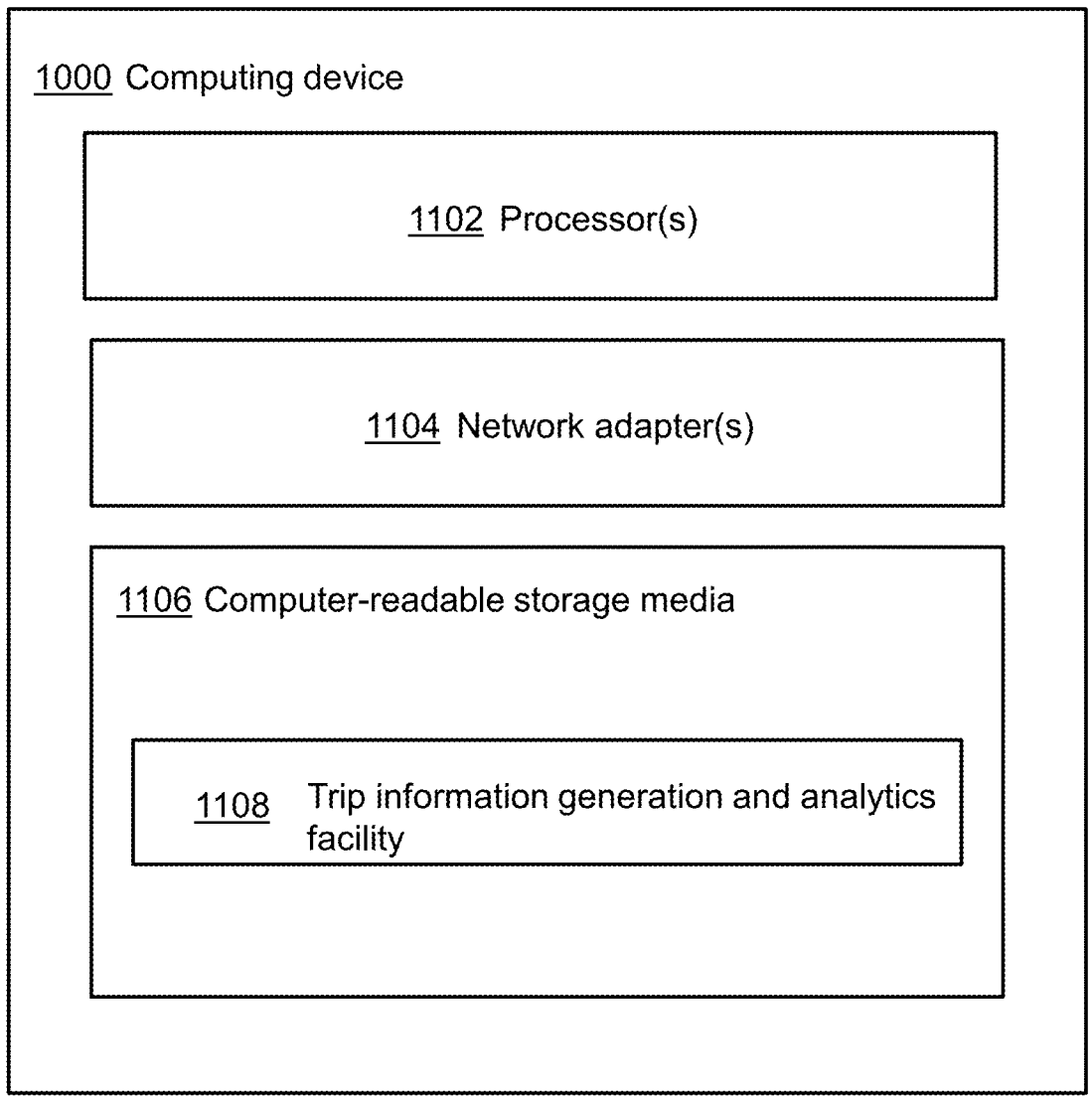
FIG. 18 is a schematic representation of one embodiment of software.

FIG. 18 illustrates one exemplary implementation of a computing device in the form of a computing device 1000 that may be used in a system implementing techniques described herein, although others are possible. It should be appreciated that FIG. 18 is intended neither to be a depiction of necessary components for a computing device to operate as a telematics data distributor in accordance with the principles described herein, nor a comprehensive depiction.

Computing device 1000 may comprise at least one processor 1102, a network adapter 1104, and computer-readable storage media 1106. Computing device 1000 may be, for example, a desktop or laptop personal computer, a personal digital assistant (PDA), a smart mobile phone, a server, or any other suitable computing device. Network adapter 1104 may be any suitable hardware and/or software to enable the computing device 1000 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 1106 may be adapted to store data to be processed and/or instructions to be executed by processor 1102. Processor 1102 enables processing of data and execution of instructions. The data and instructions may be stored on the computer-readable storage media 1106.

The data and instructions stored on computer-readable storage media 1106 may comprise computer-executable instructions implementing techniques which operate according to the principles described herein. In the example of FIG. 18, computer-readable storage media 1106 stores computer-executable instructions implementing various facilities and storing various information as described above. Computer-readable storage media 1106 may store a trip information generation and analytics facility 1108 that carries out any of the techniques described herein for estimation of precipitation.

While not illustrated in FIG. 18, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

The invention claimed is:

1. A method for determining a contiguous region in a road network, the method comprising:
   obtaining, in real time, telematics data from one or more telematics devices associated with one or more vehicles, the telematics data including trip data of a plurality of trips taken by the one or more vehicles;
   generating a graph representation of the road network, the graph representation including one or more edges representing one or more road segments in the road network, wherein generating the graph representation comprises processing map data that describes road locations as a series of GPS locations;
   identifying intersections of major roads in the graph representation of the road network;
   tracing each edge extending from each intersection of the intersections to determine a first list of edges from the intersections to a first middle spot of a first contiguous region;
   generating, based on the first list of edges to the first middle spot from each intersection, the first contiguous region; and
   assigning a speed limit to the first contiguous region at least in part by:
      identifying, from the trip data, speed metrics associated with the first list of edges, and
      assigning the speed limit to the first contiguous region based on the speed metrics associated with the first list of edges.

2. The method of claim 1, wherein the one or more vehicles comprises a first vehicle and a second vehicle, wherein the trip data includes GPS data associated with the plurality of trips, wherein the GPS data comprises first GPS data associated with a first trip taken by the first vehicle and second GPS data associated with a second trip taken by the second vehicle, and wherein the method further comprises:
   associating the first GPS data with the graph representation of the road network at least in part by:
      identifying a first ordered sequence of edges of the graph representation traversed by the first vehicle during the first trip taken by the first vehicle; and
      associating the first GPS data with the first ordered sequence of edges;
   associating the second GPS data with the graph representation of the road network at least in part by:
      identifying a second ordered sequence of edges of the graph representation traversed by the second vehicle during the second trip taken by the second vehicle, and
      associating the second GPS data with the second ordered sequence of edges;
   generating first trip information for the first trip using the association between the first GPS data and the first ordered sequence of edges; and
   generating second trip information for the second trip using the association between the second GPS data and the second ordered sequence of edges.

3. The method of claim 2, further comprising:
   counting a number of times each edge appears in both the first trip and the second trip;
   grouping a similar route based on a shared edge distance between the first trip and the second trip being greater than a threshold edge distance; and
   outputting the grouped routes to a user.

4. The method of claim 3, wherein the threshold edge distance is greater than or equal to 75% of a total trip distance.

5. The method of claim 1, further comprising:
   obtaining speed metrics for a first trip of a first vehicle;
   associating the speed metrics of the first trip with the one or more edges of the road network;
   comparing a first speed metric of the speed metrics with a known speed limit metric associated with a first edge of the one or more edges; and
   generating, based on a second speed metric and the comparison of the first speed metric and the known speed limit metric, a prediction of a speed limit for a second edge without a known speed limit metric.

6. The method of claim 1, further comprising:
   identifying an ordered sequence of edges of the graph representation of the road network traversed by a vehicle during a trip;
   identifying one or more deviations in the ordered sequence of edges for the trip, wherein the one or more deviations are less than a threshold deviation distance from a route of the ordered sequence of edges.

7. The method of claim 6, wherein the threshold deviation distance is less than 2% of a total route distance of the ordered sequence of edges.

8. The method of claim 1, further comprising:
   tracing each edge extending from each intersection of the intersections to determine a second list of edges from the intersections to a second middle spot of a second contiguous region;
   generating, based on the second list of edges to the second middle spot from each intersection, the second contiguous region;
   determining if the first contiguous region and the second contiguous region share a shared intersection; and
   upon determining the first contiguous region and the second contiguous region share the shared intersection, merging the first contiguous region and the second contiguous region into a third contiguous region.

9. A system for generating trip information, the system comprising:

at least one processor; and at least one storage medium having encoded thereon executable instructions, that when executed by the at least one processor, cause the at least one processor to carry out a method, wherein the method comprises:

obtaining, in real time, telematics data from one or more telematics devices associated with one or more vehicles, the telematics data including trip data of a plurality of trips taken by the one or more vehicles;

generating a graph representation of a road network, the graph representation including one or more edges representing one or more road segments in the road network, wherein generating the graph representation comprises processing map data that describes road locations as a series of GPS locations;

identifying intersections of major roads in the graph representation of the road network;

tracing each edge extending from each intersection of the intersections to determine a first list of edges from the intersections to a first middle spot of a first contiguous region;

generating, based on the first list of edges to the first middle spot from each intersection, the first contiguous region; and assigning a speed limit to the first contiguous region at least in part by:

identifying, from the trip data, speed metrics associated with the first list of edges, and assigning the speed limit to the first contiguous region based on the speed metrics associated with the first list of edges.

10. The system of claim 9, wherein the one or more vehicles comprises a first vehicle and a second vehicle, wherein the trip data includes GPS data associated with the plurality of trips, wherein the GPS data comprises first GPS data associated with a first trip taken by the first vehicle and second GPS data associated with a second trip taken by the second vehicle, and wherein the method further comprises:

associating the first GPS data with the graph representation of the road network at least in part by:

identifying a first ordered sequence of edges of the graph representation traversed by the first vehicle during the first trip taken by the first vehicle; and associating the first GPS data with the first ordered sequence of edges;

associating the second GPS data with the graph representation of the road network at least in part by:

identifying a second ordered sequence of edges of the graph representation traversed by the second vehicle during the second trip taken by the second vehicle, and associating the second GPS data with the second ordered sequence of edges;

generating first trip information for the first trip using the association between the first GPS data and the first ordered sequence of edges; and generating second trip information for the second trip using the association between the second GPS data and the second ordered sequence of edges.

11. The system of claim 10, wherein the method further comprises:

counting a number of times each edge appears in both the first trip and the second trip;

grouping a similar route based on a shared edge distance between the first trip and the second trip being greater than a threshold edge distance; and outputting the grouped routes to a user.

12. The system of claim 11, wherein the threshold edge distance is greater than or equal to 75% of a total trip distance.

13. The system of claim 9, wherein the method further comprises:

obtaining speed metrics for a first trip of a first vehicle;

associating the speed metrics of the first trip with the one or more edges of the road network;

comparing a first speed metric of the speed metrics with a known speed limit metric associated with a first edge of the one or more edges; and generating, based on a second speed metric and the comparison of the first speed metric and the known speed limit metric, a prediction of a speed limit for a second edge without a known speed limit metric.

14. The system of claim 9, wherein the method further comprises:

identifying an ordered sequence of edges of the graph representation of the road network traversed by a vehicle during a trip;

identifying one or more deviations in the ordered sequence of edges for the trip, wherein the one or more deviations are less than a threshold deviation distance from a route of the ordered sequence of edges.

15. The system of claim 14, wherein the threshold deviation distance is less than 2% of a total route distance of the ordered sequence of edges.

16. The system of claim 9, wherein the method further comprises:

tracing each edge extending from each intersection of the intersections to determine a second list of edges from the intersections to a second middle spot of a second contiguous region;

generating, based on the second list of edges to the second middle spot from each intersection, the second contiguous region;

determining if the first contiguous region and the second contiguous region share a shared intersection; and upon determining the first contiguous region and the second contiguous region share the shared intersection, merging the first contiguous region and the second contiguous region into a third contiguous region.

17. A method of providing vehicle trip data, comprising:

obtaining, in real time, telematics data including trip data of a plurality of trips from one or more telematic devices associated with one or more vehicles;

generating a graph representation of a road network, the graph representation including one or more edges representing one or more road segments in the road network, wherein generating the graph representation comprises processing map data that describes road locations as a series of GPS locations;

associating the trip data of the plurality of trips with the graph representation of the road network;

receiving, via a graphical user interface, an origin and a destination from a user as user input;

creating an ordered sequence of edges for each trip of the plurality of trips;

determining a popular route between the origin and the destination at least in part by:

counting a number of times each edge appears in the plurality of trips;

grouping similar routes based on a shared edge distance between the plurality of trips being greater than a threshold edge distance; and identifying, based on the grouping, a popular route between the origin and the destination; and outputting, via the graphical user interface, the popular route to the user.

18. The method of claim 17, wherein the threshold edge distance is greater than or equal to 75% of a total trip distance.

19. The method of claim 17, further comprising:
identifying gaps in the trip data compared to the graph representation of a road network; and
filling in the gaps based on a shortest path between a gap start point and a gap end point.

20. The method of claim 17, wherein outputting the popular route to the user includes overlaying the popular route on a map.

* * * * *